(12) United States Patent
Isenhour et al.

(10) Patent No.: US 11,009,667 B2
(45) Date of Patent: May 18, 2021

(54) FERRULE-BASED FIBER OPTIC CONNECTORS WITH FERRULE RETRACTION BALANCING

(71) Applicant: CORNING OPTICAL COMMUNICATIONS LLC, Hickory, NC (US)

(72) Inventors: Micah Colen Isenhour, Lincolnton, NC (US); Thomas Theuerkorn, Hickory, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/117,336

(22) Filed: Aug. 30, 2018

(65) Prior Publication Data

US 2019/0011641 A1   Jan. 10, 2019

Related U.S. Application Data

(63) Continuation of application No. PCT/US2017/021768, filed on Mar. 10, 2017.

(Continued)

(51) Int. Cl.
*G02B 6/38* (2006.01)
*G02B 6/44* (2006.01)

(52) U.S. Cl.
CPC ............ *G02B 6/387* (2013.01); *G02B 6/3821* (2013.01); *G02B 6/3825* (2013.01);
(Continued)

(58) Field of Classification Search
CPC .... G02B 6/387; G02B 6/4432; G02B 6/4477; G02B 6/3893; G02B 6/3821;
(Continued)

(56) References Cited

U.S. PATENT DOCUMENTS 4,684,205 A   8/1987   Margolin et al.
5,129,023 A   7/1992   Anderson et al.
(Continued)

FOREIGN PATENT DOCUMENTS

CN   1668953 A   9/2005
GB   2468442 B   1/2011
(Continued)

OTHER PUBLICATIONS

International Search Report and Written Opinion PCT/US2017/020132 dated Jun. 9, 2017.
(Continued)

*Primary Examiner* — Ryan A Lepisto
*Assistant Examiner* — Erin D Chiem
(74) *Attorney, Agent, or Firm* — Michael E. Carroll, Jr.

(57) ABSTRACT

A ferrule-based fiber optic connectors having a ferrule retraction balancing characteristic for preserving optical performance are disclosed. The fiber optic connector comprises a connector assembly, a connector sleeve assembly and a balancing resilient member. The connector assembly comprises a ferrule and a resilient member for biasing the ferrule forward and the connector sleeve assembly comprises a housing and a ferrule sleeve, where the connector assembly is at least partially disposed in the passageway of the housing and the ferrule of the connector assembly is at least partially disposed in the ferrule sleeve. The balancing resilient member biases the housing to a forward position with the biasing resilient member having a predetermined resilient force that is greater than the friction force required for displacement of the ferrule within the ferrule sleeve.

20 Claims, 24 Drawing Sheets

Related U.S. Application Data

(60) Provisional application No. 62/306,377, filed on Mar. 10, 2016.

(52) U.S. Cl.
CPC ......... *G02B 6/3831* (2013.01); *G02B 6/3869* (2013.01); *G02B 6/3874* (2013.01); *G02B 6/3877* (2013.01); *G02B 6/3887* (2013.01); *G02B 6/3893* (2013.01); *G02B 6/3894* (2013.01); *G02B 6/4432* (2013.01); *G02B 6/4477* (2013.01); *G02B 6/3849* (2013.01); *G02B 6/3855* (2013.01)

(58) Field of Classification Search
CPC .. G02B 6/3869; G02B 6/3874; G02B 6/3887; G02B 6/3877; G02B 6/3825; G02B 6/3831; G02B 6/3894; G02B 6/3849; G02B 6/3855

See application file for complete search history.

(56) References Cited

U.S. PATENT DOCUMENTS

| | | |
|---|---|---|
| 5,179,608 A | 1/1993 | Ziebol et al. |
| 5,261,019 A | 11/1993 | Beard et al. |
| 5,293,582 A | 3/1994 | Beard et al. |
| 5,317,663 A | 5/1994 | Beard et al. |
| 5,436,995 A | 7/1995 | Yoshizawa et al. |
| 5,542,015 A | 7/1996 | Hultermans |
| 5,671,310 A | 9/1997 | Lin et al. |
| 5,781,680 A | 7/1998 | Womack et al. |
| 5,862,282 A | 1/1999 | Matsuura et al. |
| 6,048,103 A | 1/2000 | Furukata et al. |
| 6,126,325 A | 10/2000 | Yamane et al. |
| 6,152,608 A | 11/2000 | Ghara et al. |
| 6,347,888 B1 | 2/2002 | Puetz |
| 6,579,014 B2 | 6/2003 | Melton et al. |
| 6,652,156 B2 | 11/2003 | Shinagawa et al. |
| 6,712,523 B2 | 3/2004 | Zimmel |
| 6,918,703 B2 | 7/2005 | Chen et al. |
| 7,090,406 B2 | 8/2006 | Melton et al. |
| 7,113,679 B2 | 9/2006 | Melton et al. |
| 7,244,066 B2 | 7/2007 | Theuerkorn |
| 7,665,901 B2 | 2/2010 | Kewitsch |
| 7,785,015 B2 | 8/2010 | Melton et al. |
| 7,881,576 B2 | 2/2011 | Melton et al. |
| 7,918,609 B2 | 4/2011 | Melton et al. |
| 8,047,726 B2 | 11/2011 | Tamekuni et al. |
| 8,070,367 B2 | 12/2011 | Winberg et al. |
| 8,480,310 B2 | 7/2013 | Kewitsch |
| 8,596,883 B2 | 12/2013 | Taira et al. |
| 8,870,469 B2 | 10/2014 | Kachmar |
| 9,069,140 B2 | 6/2015 | Park |
| 9,213,147 B2 | 12/2015 | Mitchell et al. |
| 9,256,033 B2 | 2/2016 | Nielson |
| 9,297,976 B2 | 3/2016 | Hill et al. |
| 9,488,788 B2 | 11/2016 | Murray et al. |
| 9,612,407 B2 | 4/2017 | Kobayashi et al. |
| 10,215,926 B2 | 2/2019 | Ott |
| 2002/0181889 A1 | 12/2002 | Ozeki et al. |
| 2003/0063866 A1 | 4/2003 | Melton et al. |
| 2004/0223720 A1 | 11/2004 | Melton et al. |
| 2005/0053342 A1 | 3/2005 | Melton et al. |
| 2007/0077010 A1 | 4/2007 | Melton et al. |
| 2008/0019642 A1 | 1/2008 | Kewitsch |
| 2009/0041411 A1 | 2/2009 | Melton et al. |
| 2009/0060423 A1 | 3/2009 | Melton et al. |
| 2009/0185779 A1 | 7/2009 | Gurreri et al. |
| 2009/0271126 A1 | 10/2009 | Gurreri et al. |
| 2010/0104243 A1 | 4/2010 | Kewitsch |
| 2011/0085764 A1 | 4/2011 | Greub et al. |
| 2011/0229085 A1 | 9/2011 | Bradley et al. |
| 2011/0280521 A1 | 11/2011 | Kachmar |
| 2012/0057830 A1 | 3/2012 | Taira et al. |
| 2012/0057831 A1 | 3/2012 | Taira et al. |
| 2013/0114931 A1 | 5/2013 | Mitchell et al. |
| 2013/0136401 A1 | 5/2013 | Cooke et al. |
| 2013/0163934 A1 | 6/2013 | Lee et al. |
| 2013/0170797 A1 | 7/2013 | Ott |
| 2014/0064671 A1* | 3/2014 | Barnette, Jr. .......... G02B 6/381 385/81 |
| 2014/0205241 A1 | 7/2014 | Nielson |
| 2016/0061690 A1 | 3/2016 | Elkins, II et al. |
| 2016/0139345 A1 | 5/2016 | Nielson |
| 2016/0324402 A1 | 11/2016 | Yajima |
| 2017/0160476 A1* | 6/2017 | Beier .................. G02B 6/3893 |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2018/0372962 A1 | 12/2018 | Isenhour et al. |
| 2019/0011641 A1 | 1/2019 | Isenhour et al. |
| 2019/0094460 A1 | 3/2019 | Brusberg et al. |
| 2019/0235174 A1 | 8/2019 | Ott |
| 2019/0339460 A1 | 11/2019 | Dannoux et al. |
| 2019/0339461 A1 | 11/2019 | Dannoux et al. |
| 2019/0391342 A1 | 12/2019 | Wilson et al. |
| 2020/0073067 A1 | 3/2020 | Lohse et al. |

FOREIGN PATENT DOCUMENTS

| | | |
|---|---|---|
| JP | 2013218103 A | 10/2013 |
| WO | 2013173273 A1 | 11/2013 |
| WO | 2014133837 A1 | 9/2014 |

OTHER PUBLICATIONS

International Search Report and Written Opinion PCT/us2017/021766 dated Jun. 23, 2017.
International Search Report and Written Opinion PCT/US2017/021768 dated Jun. 9, 2017.
Chinese Patent Application No. 201780025927.2; English Translation of the First Office Action dated Dec. 12, 2019; China Patent Office; 12 pgs.

* cited by examiner

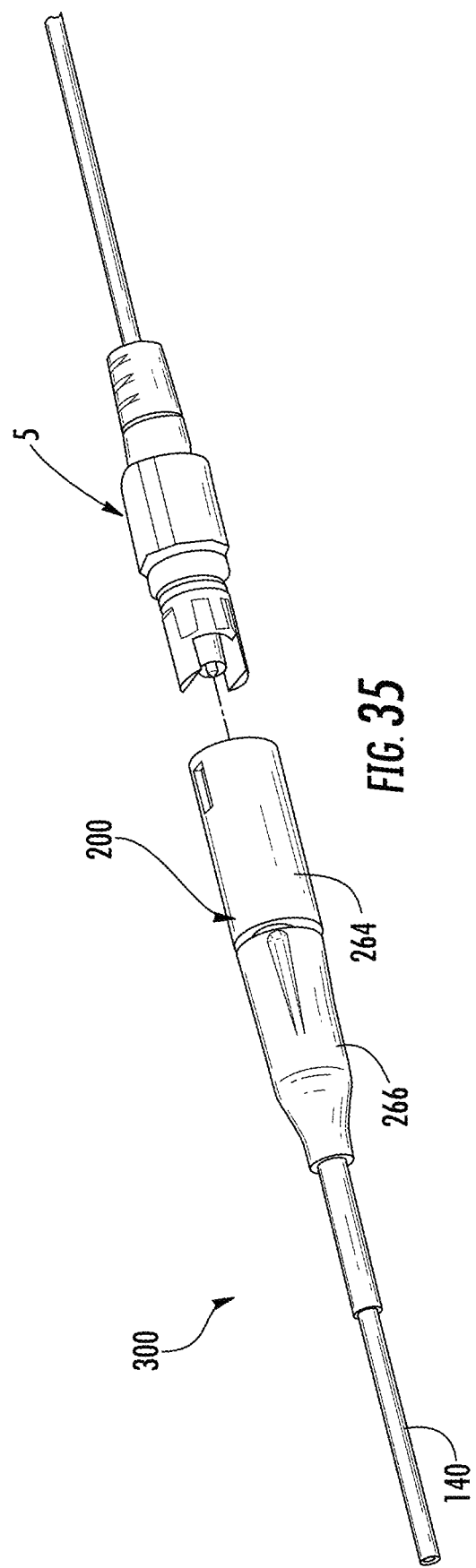

FERRULE-BASED FIBER OPTIC CONNECTORS WITH FERRULE RETRACTION BALANCING

CROSS-REFERENCE TO RELATED APPLICATIONS

This application is a continuation of International Application No. PCT/US17/21768, filed on Mar. 10, 2017, which claims the benefit of priority to U.S. Provisional Application No. 62/306,377, filed on Mar. 10, 2016, the content of which is relied upon and incorporated herein by reference.

BACKGROUND

The disclosure is directed to fiber optic connectors having a translatable ferrule with one or more optical fibers along with cable assemblies using the fiber optic connectors. More specifically, the disclosure is directed to ferrule-based fiber optic connectors having a balanced ferrule retraction characteristic for preserving optical performance.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx and the like. To address this need for making optical connections in communication networks for the outside the plant environment hardened fiber optic connectors were developed. One of the most commercially successful hardened fiber optic connectors is the OptiTap® male plug connector sold by Corning Cable Systems, LLC of Hickory, N.C., such as disclosed in U.S. Pat. Nos. 7,090,406 and 7,113,679 (the '406 and '679 patents) and incorporated herein by reference. The Optitap® connector is a hardened male plug connector for terminating a cable that is configured for optical connection using a receptacle. As used herein, the term "hardened" describes a connector or receptacle port intended for making an environmentally sealed optical connection suitable for outdoor use, and the term "non-hardened" describes a connector or receptacle port that is not intended for making an environmentally sealed optical connection such as a SC connector.

FIGS. 1A-1C are prior art depictions showing various stages of mating of a preconnectorized cable 10 having a plug connector 5 such as an OptiTap® connector with a receptacle 30. Receptacle 30 mates plug connector 5 with a standard SC connector (i.e., a non-hardened connector) at a second end (not visible in these views) using an adapter sleeve for aligning ferrules when mating plug connector 5 with the a non-hardened connector. Protection of the non-hardened connector side of the receptacle is typically accomplished by mounting the receptacle 30 through a wall of an enclosure or the like so that the non-hardened end of the receptacle is disposed inside the enclosure for environmental protection of the non-hardened connector. As shown by FIGS. 1A-1C, the other end of the receptacle 30 is accessible for receiving the plug connector 5 at the wall of the enclosure. Other applications may mount the receptacle 30 inside an enclosure on a bracket or the like.

Receptacle 30 allows an optical connection between the hardened connector such as the OptiTap® male plug connector with a non-hardened connector such as the SC connector at nodes in the optical network that typically transition from an outdoor space to an indoor space. FIG. 2 depicts an exploded view of receptacle 30, which is described in further detail in U.S. Pat. No. 6,579,014. As depicted, receptacle 30 includes a receptacle housing 12 and an adapter sleeve 18 disposed therein. The receptacle 30 receives a non-hardened connector at a second end 16 as represented by the arrow pointing to the left Adapter sleeve 18 is biased toward a first end 14 of the receptacle 30 that receives the connector 5 using springs 38. This biasing of the adapter sleeve 18 toward the first end 14 that receives the plug connector 5 is used for maintaining physical ferrule-to-ferrule contact between the plug connector and the SC connector to increase the "float" between the mating ferrules. When mated, the ferrule of the plug connector 5 is not latched to the adapter sleeve and springs 38 of receptacle 30 are used for increasing the "float" between the mating ferrules of the plug connector and the non-hardened connector and is used because.

Network operators often desire to optically connect a first hardened connector to another hardened connector in a space that requires a rugged connection point, which receptacle 30 is incapable of accomplishing. Consequently, there exists an unresolved need for fiber optic connectors that can mate directly with to another hardened connector in a quick and reliable manner while providing a ruggedized solution that preserves optical performance.

SUMMARY

The disclosure is directed to ferrule-based fiber optic connectors having a ferrule displacement balancing construction for inhibiting the loading-up of the ferrule displacement within the fiber optic connector, which can cause undue optical attenuation when mated with a complimentary connector. As discussed herein, the balancing of the ferrule retraction in ferrule-based fiber optic connectors depend on several factors related to the frictional forces between the ferrule and the ferrule sleeve, and the concepts disclosed use a balancing resilient member having a predetermined resilient force that is greater than the friction force required for displacement of the ferrule within the ferrule sleeve. The concepts disclosed are useful for hardened fiber optic connectors that mate directly to hardened plug connectors. As an example the concepts are useful with a female hardened connector that mates with a hardened plug connector, but other applications for the concepts disclosed are possible and advantageous as well. Thus, the concepts also allow a compact footprint for fiber optic connectors since the spatial arrangement is more compact than the prior art.

One aspect of the disclosure is directed to a fiber optic connector comprising a connector assembly comprising a ferrule and a resilient member for biasing the ferrule forward, a connector sleeve assembly and a balancing resilient member. The connector sleeve assembly comprises a housing with a passageway between a first end and a second end along with a ferrule sleeve. When assembled, the connector assembly is at least partially disposed in a passageway of the housing and the ferrule of the connector assembly is at least partially disposed in the ferrule sleeve. The balancing resilient member for biasing the housing to a forward position comprises a predetermined resilient member force that is greater than the friction force required for displacement of the ferrule within the ferrule sleeve. By way of example, the predetermined resilient force of the balancing resilient member may be 2.5 Newton or greater, but other predetermined resilient forces are possible.

Another aspect of the disclosure is directed to a fiber optic connector comprising a connector assembly comprising a ferrule and a resilient member for biasing the ferrule forward, a connector sleeve assembly and a balancing resilient member. The connector sleeve assembly comprises a housing with a passageway between a first end and a second end along with a ferrule sleeve. When assembled, the connector assembly is at least partially disposed in a passageway of the connector sleeve assembly and the ferrule of the connector assembly is at least partially disposed in the ferrule sleeve. The balancing resilient member for biasing the housing to a forward position comprises a predetermined resilient force that is 5 Newton or greater.

Still another aspect of the disclosure is directed to a fiber optic connector comprising a connector assembly comprising a ferrule and a resilient member for biasing the ferrule forward, a connector sleeve assembly and a balancing resilient member. The connector sleeve assembly comprises a housing with a passageway between a first end and a second end along with a ferrule sleeve and a latch. When assembled, the connector assembly is at least partially disposed in a passageway of the connector sleeve assembly and the ferrule of the connector assembly is at least partially disposed in the ferrule sleeve. The balancing resilient member for biasing the housing to a forward position with the latch configured for engaging the connector assembly when assembly and the balancing resilient member comprising a predetermined resilient force that is greater than the friction force required for displacement of the ferrule within the ferrule sleeve.

Yet another aspect of the disclosure is directed to a fiber optic connector comprising a connector assembly comprising a housing, a ferrule and a resilient member for biasing the ferrule forward, a connector sleeve assembly, a balancing resilient member, and a female coupling housing. The connector sleeve assembly comprises a housing with a passageway between a first end and a second end along with a ferrule sleeve and a latch. When assembled, the connector assembly is at least partially disposed in a passageway of the connector sleeve assembly and the ferrule of the connector assembly is at least partially disposed in the ferrule sleeve. The balancing resilient member for biasing the housing to a forward position with the latch configured for engaging the connector assembly when assembled and the balancing resilient member comprising a predetermined resilient force that is greater than the friction force required for displacement of the ferrule within the ferrule sleeve. The female coupling housing comprises an opening for receiving a complimentary connector.

Also disclosed are methods of assembling a fiber optic connector assembly comprising providing a connector assembly comprising a ferrule and a resilient member for biasing the ferrule forward; providing a connector sleeve assembly comprising a housing with a passageway between a first end and a second end, a ferrule and a latch; inserting the connector assembly at least partially into the passageway of the connector sleeve assembly and inserting the ferrule at least partially into the ferrule sleeve; and installing a balancing resilient member for biasing the connector sleeve assembly to a forward position with the latch of the connector assembly engaging the connector assembly, wherein the biasing resilient member has a predetermined resilient force that is greater than the friction force required for displacing the ferrule within the ferrule sleeve.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 35 is a perspective view of the cable assembly of FIG. 24 being aligned with a complimentary connector for mating.

DETAILED DESCRIPTION

Reference will now be made in detail to the embodiments of the disclosure, examples of which are illustrated in the accompanying drawings. Whenever possible, like reference numbers will be used to refer to like components or parts.

The fiber optic connectors and cable assemblies described herein are suitable for making optical and/or optical-electrical connections (if electrical connections are included in the connectors) to a conventional male hardened plug connector Although the concepts disclosed herein are explained with respect to a female hardened fiber optic connector used for optical connection with the male hardened plug connector an OptiTap connector, the concepts disclosed may be used with other fiber optic connectors hardened or not and are not limited to this particular optical connection.

The concepts of the disclosure advantageously allow robust and reliable optical connections for ferrule-based fiber optic connectors by balancing the ferrule retraction and inhibiting the loading-up of the ferrule displacement in the fiber optic connector that can occur during assembly and/or during mating, thereby avoiding undue optical attenuation. As explained below, the balancing the ferrule retraction in ferrule-based fiber optic connectors depend on several factors, but the concepts disclosed direct the frictional forces to the ferrule-to-ferrule forces in the alignment sleeve to inhibit the loading-up of ferrule displacement in the fiber optic connector.

Figure 2:
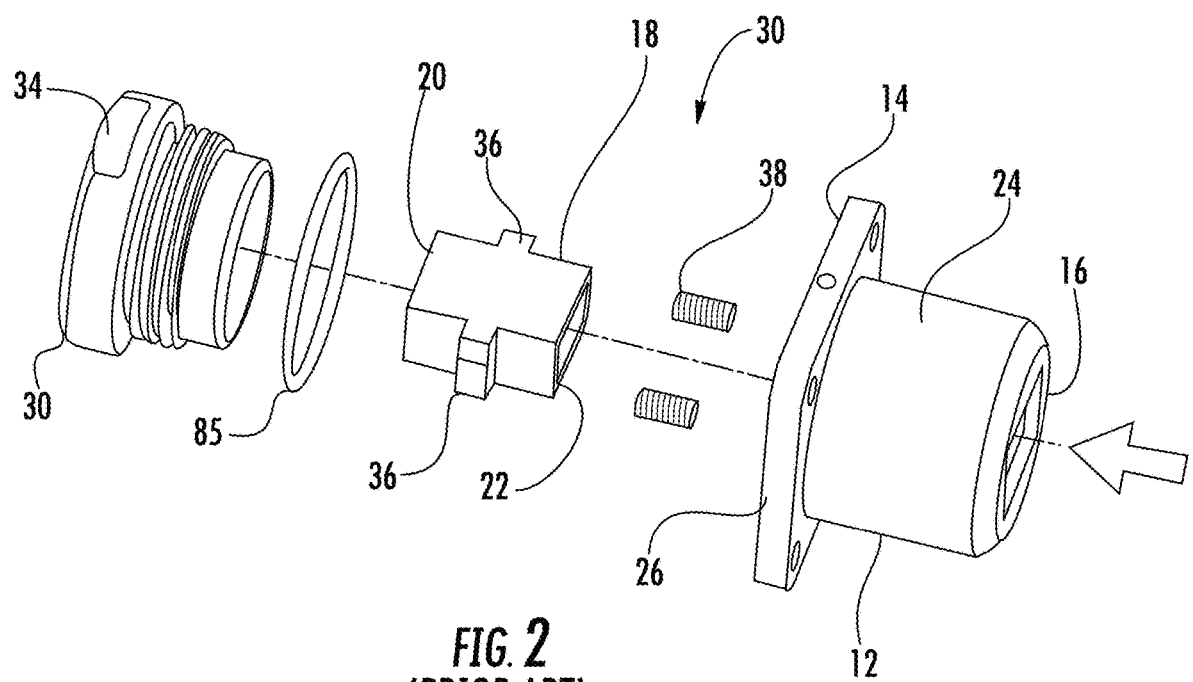
FIG. 2 is a partially exploded view of a conventional receptacle such as depicted in FIGS. 1A-1C for mating a hardened connector with a non-hardened connector.
Figure 3:
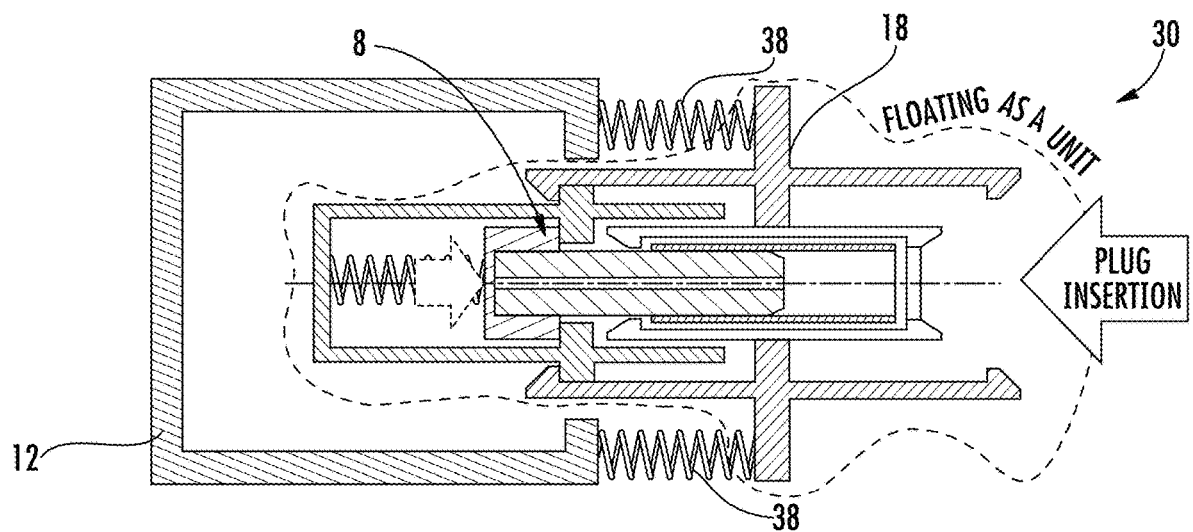
FIG. 3 is a schematic force-loading diagram for the conventional receptacle of FIG. 2 with its floating biasing spring construction according to the prior art.

For explanatory purposes, the operation of the prior art receptacle 30 of FIG. 2 is explained using a schematic force-loading diagram of FIG. 3. Thereafter, reference will be made in detail to the concepts disclosed herein using the schematic force-loading diagram of FIG. 4, along with example embodiments of fiber optic connector 100 which are illustrated in the accompanying drawings. As depicted, the schematic force-loading diagrams are models showing different constructions for the conventional receptacle 30 (FIG. 3) and fiber optic connectors 100 (FIG. 4) according to the present application.

FIG. 3 is a schematic force-loading diagram for the conventional receptacle 30 of FIG. 2 depicting its "floating biasing spring" construction for mating a hardened connector with a non-hardened connector. In the "floating biasing spring" construction of receptacle 30 the non-hardened connector 8 floats as a unit with adapter sleeve 18. FIG. 3 depicts a dashed line drawn around the adapter sleeve 18 and the non-hardened connector 8 and the dashed line represents that the adapter sleeve 18 and non-hardened connector 8 "floating as a unit" within a receptacle housing 12 according to conventional receptacle 30 of the prior art. As shown, springs 38 bias the floating unit toward a first end 14 of the receptacle 30 that receives the plug connector 5. The arrow of FIG. 3 pointing to the left represents the insertion direction of the hardened connector such as plug connector 5 being inserted into receptacle 30.

On the other hand, the fiber optic connectors and fiber optic cable assemblies of the present application have a different construction and operation from receptacle 30 with the "floating biasing spring" construction. Unlike receptacle 30, the fiber optic connectors disclosed herein do not have a floating unit (i.e., an adapter sleeve and non-hardened connector that "float" as a unit) that moves together relative to the housing of the connector.

Figure 4:
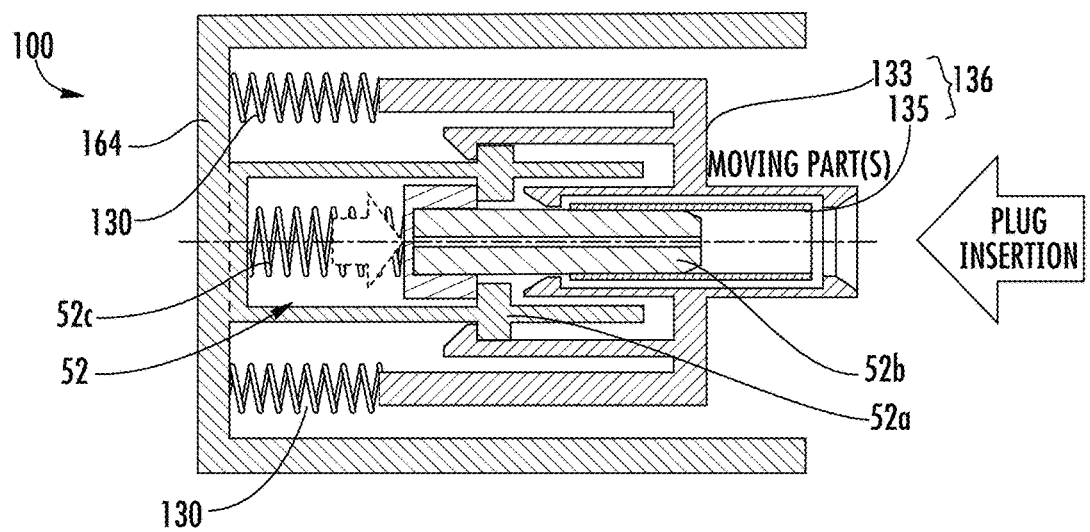
FIG. 4 is a schematic force-loading diagram for a fiber optic connector with a ferrule retraction balancing construction according to the concepts disclosed herein.

The concepts of the present application represented by FIG. 4 disclose fiber optic connectors comprising a ferrule retraction balancing construction. Unlike the prior art receptacle 30 shown in the schematic force-loading diagram of FIG. 2, the fiber optic connector 100 of FIG. 4 has a connector assembly 52 that is fixed (i.e., inhibited from freely traveling) to the fiber optic connector such as fixed to a connector housing 164 of fiber optic connector 100 and the connector sleeve assembly 136 floats relative to the connector housing 164. Having the connector assembly 52 "fixed" to the fiber optic connector means that the connector assembly is inhibited from traveling by a portion of the fiber optic connector such as an inner portion of the fiber optic connector like a retention body that may secure the connector assembly or the travel may be inhibited by an outer portion of the connector such as an outer housing depending on the construction of the connector. The construction of fiber optic connector 100 depicted in FIG. 4 has an operation that is very different than the construction of receptacle 30 of FIG. 2.

With the connector assembly 52 fixed to the fiber optic connector as depicted in FIG. 4 it is possible for the "loading-up" of ferrule displacement to occur, which can cause undue levels of optical attenuation. The present application solves the issues of ferrule displacement by using a ferrule retraction balancing construction for fiber optic connectors disclosed herein and is directed to balancing out the forces related to the ferrule sleeve friction during assembly and mating.

Fiber optic connectors 100 having a ferrule displacement balancing construction according to the concepts disclosed comprise a connector assembly 52, a connector sleeve assembly 136 and one or more balancing resilient members 130 for inhibiting the loading-up of the ferrule displacement within the fiber optic connector. The concepts disclosed maybe embodiment in a variety of different connector constructions. Moreover, the one or more balancing resilient members may take any suitable form such as a wave spring, a coil spring, leaf springs, etc. to provide the predetermined resilient force.

Fiber optic connectors 100 according to the concepts disclosed comprise a balancing resilient member 130 for biasing a housing 133 of a connector sleeve assembly 136 to a forward position. As used herein, "a forward position" is the direction pointing from a rear of the connector to the mating face of the fiber optic connector.

The biasing resilient member 130 has a predetermined resilient force that is greater than the friction force required for displacement of a ferrule 52b of the connector assembly 52 within the ferrule sleeve 135 of the connector sleeve assembly 136 to provide a ferrule retraction balancing construction The details of use of the biasing resilient member 130 having a predetermined resilient force that is greater than the friction force required for displacement of a ferrule 52b of the connector assembly 52 within the ferrule sleeve 135 is explained in more detail below.

Fiber optic connectors disclosed herein include a connector assembly 52 comprising a ferrule 52b and a resilient member 52c. By way of example, and not limitation, suitable connector assemblies may include LC, SC along with other connector assemblies having a ferrule and ferrule sleeve arrangement as desired. Fiber optical connectors disclosed herein are advantageous for efficiently and economically streamlining the deployment and installation of fiber optic networks since they provide a robust and reliable operation. Moreover, different connector designs according to the concepts disclosed may have different force requirements for the balancing resilient member since the friction forces required for displacement of a ferrule within a ferrule sleeve may vary by the connector type. In one embodiment, the balancing resilient member 130 has a resilient member force of 2.5 Newton or greater, but other values are possible according to the concepts disclosed such as 5 Newton or greater or even 8 Newton or greater. By way of explanation, and not limitation, the friction force for a SC connector may be greater than the friction forces for an LC connector since the SC connector has a ferrule with a larger surface area in contact with the respective ferrule sleeve.

By way of example, if a ferrule has a diameter of about 2.5 millimeters such as in a SC connector assembly, then the balancing resilient member may have a predetermined resilient force of 5 Newton or greater. If a ferrule has a smaller diameter such as about 1.25 millimeter like used in a LC connector assembly, then the balancing resilient member may have a predetermined resilient force of 2.5 Newton or greater. These are explanatory examples and other values for the predetermined resilient force are possible.

FIGS. 5-12 depict further schematic representations showing the assembly and operation of the fiber optic connectors 100 using the concepts disclosed herein to inhibit the "loading-up" of ferrule displacements. FIGS. 8-12 show the operation of fiber optic connectors 100 during mating with a complimentary connector to explain the concepts disclosed in further detail.

The problem with conventional connectors is that, typically, one connector assembly having a ferrule is pre-inserted into the connector sleeve assembly creating a fiber optic connector. Later a mating connector is inserted into fiber optic connector 100 such as shown by the arrow in FIG. 4 to represent insertion of the plug connector to make an optical connection. Although both of the mating connector assemblies of fiber optic connector 100 and the mating plug connector represented by the arrow are similar, the behavior of the individual connector assemblies of the plug connector and the fiber optic connector 100 are not similar during mating. The ceramic based ferrules of fiber optic connectors are axially aligned for physical contact during mating using a ferrule sleeve 135 having a precision-fit with the ferrules that are inserted therein. However, this ferrule sleeve 135 is positioned within a housing 133 of the connector sleeve assembly 136 so that it is "loosely captive" within the housing 133. "Loosely captive" means that the ferrule sleeve 135 is held within the housing 133 such that it has no impediment to expanding as a ferrule enters, along with having space to accommodate variations in the initial mating angle of mating ferrules, and the ferrule sleeve 135 may also move axially. These movements of the ferrule sleeve are required to allow alignment and proper mating of the ferrule faces for inhibiting undue optical attenuation in the mating connectors.

There is a friction force between the ceramic ferrule and ferrule sleeve that must be overcome during assembly. Consider the ferrule of the first fiber optic connector being "prepositioned" within the ferrule sleeve so its endface is disposed about halfway into the length of the ferrule sleeve. The ferrule sleeve being "loosely captive" within the housing is "pushed" during this "prepositioning" to the farthest point within the housing away from the inserted ferrule (i.e., to the far end where it awaits the complimentary mating ferrule. The ferrule sleeve will not move on its own from this position due to the static friction force between ferrule sleeve and ferrule of the connector assembly.

When the mating ferrule of the complimentary connector encounters the ferrule sleeve of the first fiber optic connector during mating, the mating ferrule causes the ferrule sleeve to "open" to receive the mating ferrule. Generally speaking, the ferrules sleeve typically has a lead-in feature such as a chamfer to ease this initial transition. Once "open" the mating ferrule may be inserted into the ferrule sleeve until it encounters the ferrule of the first fiber optic connector for physical contact during mating. However, it is likely that the mating ferrules/ferrule sleeve are displaced from a generally centered position, which can cause undue optical attenuation and/or other performance issues. For instance, the mating ferrule of the plug connector may be displaced by a distance than is greater than the design parameters of the plug connector being mated with the first fiber optic connector. Although the connectors may still be mated, this uneven displacement of ferrules is undesirable and may cause elevated levels of optical attenuation, reduce reliability and/or cause other issues for the mated connectors.

Figure 5:
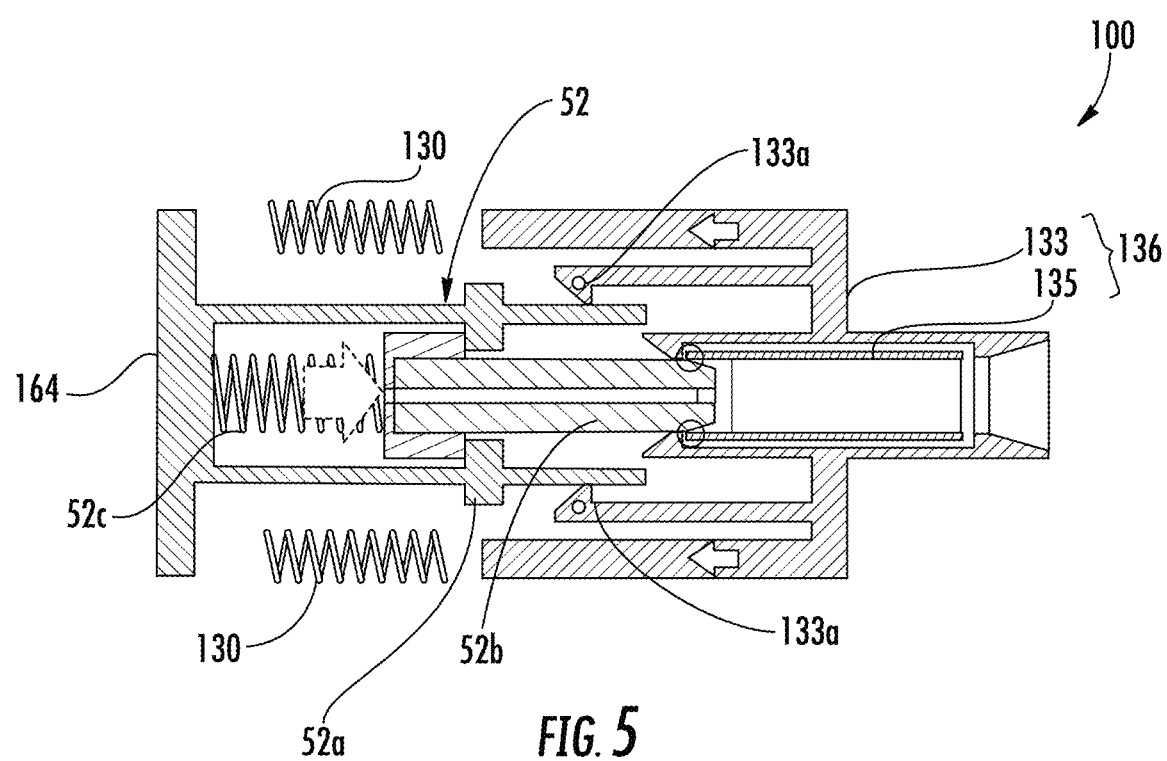
FIGS. 5 and 6 depict simplified schematic representations of the fiber optic connector depicting, respectively, the pre-assembly and post-assembly state of the fiber optic connector having a ferrule retraction balancing construction for inhibiting the loading of ferrule displacement as disclosed herein.
Figure 6:
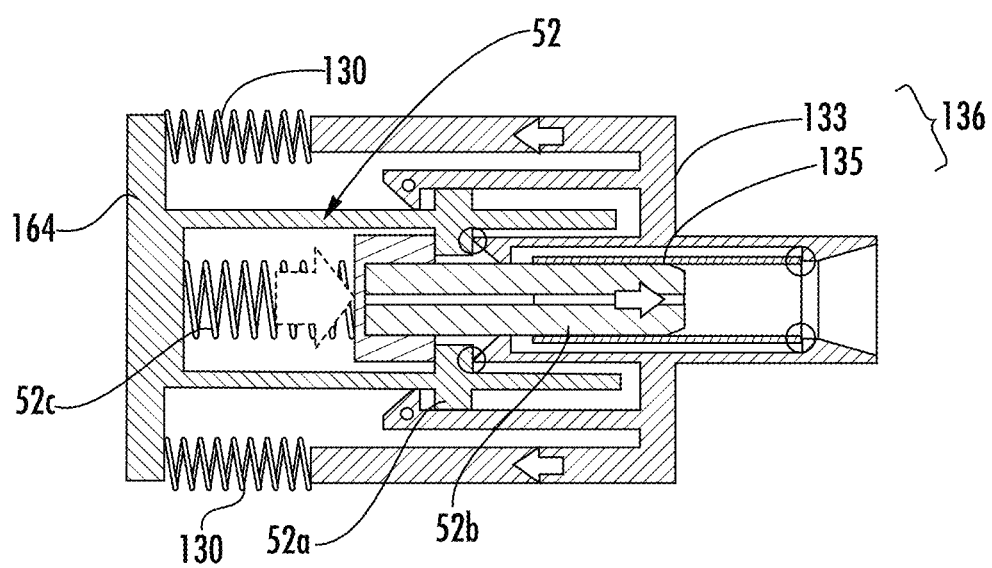

The present application solves this problem of unbalanced displacement of ferrules during mating by providing fiber optic connectors with a ferrule retraction balancing construction. FIGS. 5 and 6 respectively depict the pre-assembly insertion forces and displacements and FIG. 7 depicts the post-assembly state of fiber optic connector 100 having a ferrule retraction balancing construction as disclosed herein.

FIG. 5 depicts the ferrule 52b of connector assembly 52 being inserted into connector sleeve assembly 136 before latches 133a of housing 133 secure connector assembly 52 and before the one or more balancing resilient members 130 are contacted to exert a restoring force. As depicted, the ferrule sleeve 135 is disposed generally in the middle of a passageway of housing 133 and is "loosely captive". Ferrule 52b has a precision fit within ferrule sleeve 133 for precisely aligning of the optical cores of the optical fibers secured in the respective mating ferrules. As a result of this precision fit, the ferrule 52b contacts the ferrule sleeve 133 during assembly (as shown at the circled portions of FIG. 5) and the ferrule generates a force that pushes and displaces the ferrule sleeve 135 to the right within the housing 133 when the connector sleeve assembly 136 is pushed onto connector assembly 52 until it hits a hard stop.

The insertion of the connector assembly 52 into the connector sleeve assembly 136 continues until the latches 133a on the latch arms of housing 133 engage and overcome the geometry to secure the connector assembly 52 in the connector sleeve assembly as shown in FIG. 6. During assembly, the latch arms will deflect on the ramps of latches 133a until the latches 133a overcome the connector assembly 52 and snap over and secure the connector assembly 52. At this point, the ferrule sleeve 135 is displaced to the right so the ferrule sleeve 135 contacts and is stopped by the far end of housing 133 as shown in the far right circled portions of FIG. 6.

Figure 7:
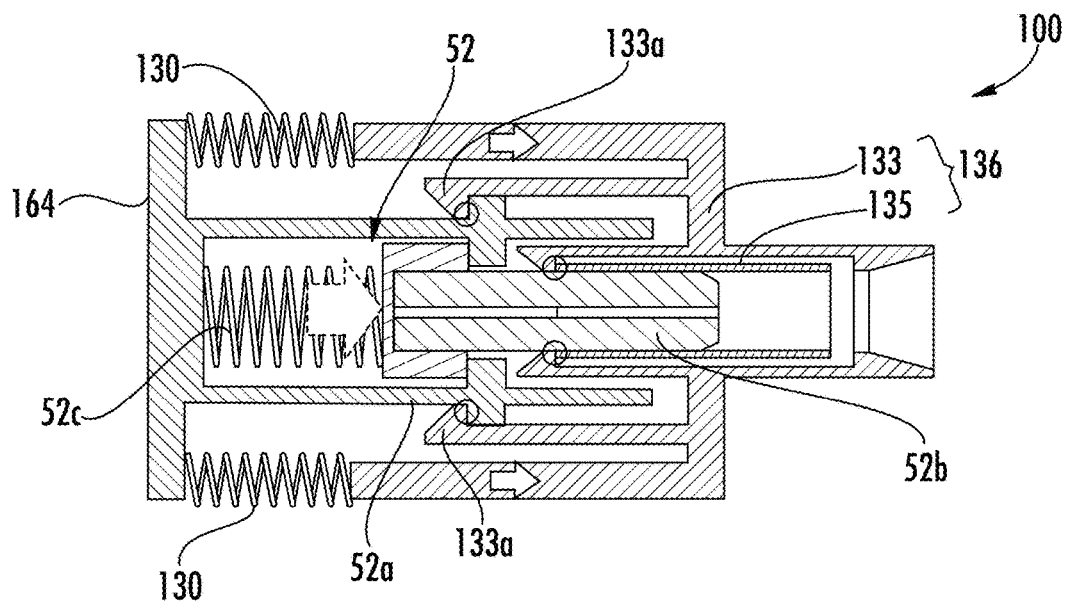
FIG. 7 is a schematic representation of the fiber optic connector of FIG. 6 depicting the friction holding the ferrule sleeve relative to the ferrule while the balancing resilient member locates the adapter sleeve with the latch of the housing.

Upon removal of the insertion forces for connector sleeve assembly 136 the balancing resilient member 130 provides a restoring force to displace the housing 133 of the connector sleeve assembly back to the right to eliminate the gap (FIG. 6) between the housing 133 and connector assembly 52 as shown in FIG. 7.

FIG. 7 is a schematic representation of the fiber optic connector of FIG. 6 depicting the friction holding the ferrule sleeve 135 relative to the ferrule 52b while the balancing resilient member(s) 130 locates the adapter sleeve assembly 136 generally in contact with the latches 133a of the housing 133. Generally speaking, this is the state the fiber optic connector 100 remains in until being mated with a complimentary connector.

This construction of fiber optic connectors 100 using one or more balancing resilient members 130 allows the housing 133 of the connector sleeve assembly 136 to translate axially toward the fiber optic connector housing 164 for a predetermined distance. This translation has the effect of moving the housing 133 relative to the ferrule sleeve 133, relieving a hard stop and allowing the ferrule 52b of the connector assembly 52 to "balance" with the mating ferrule by permitting the springs 52c of opposing connector assemblies 52 to react to one another essentially without the additional force vectors.

Figure 8:
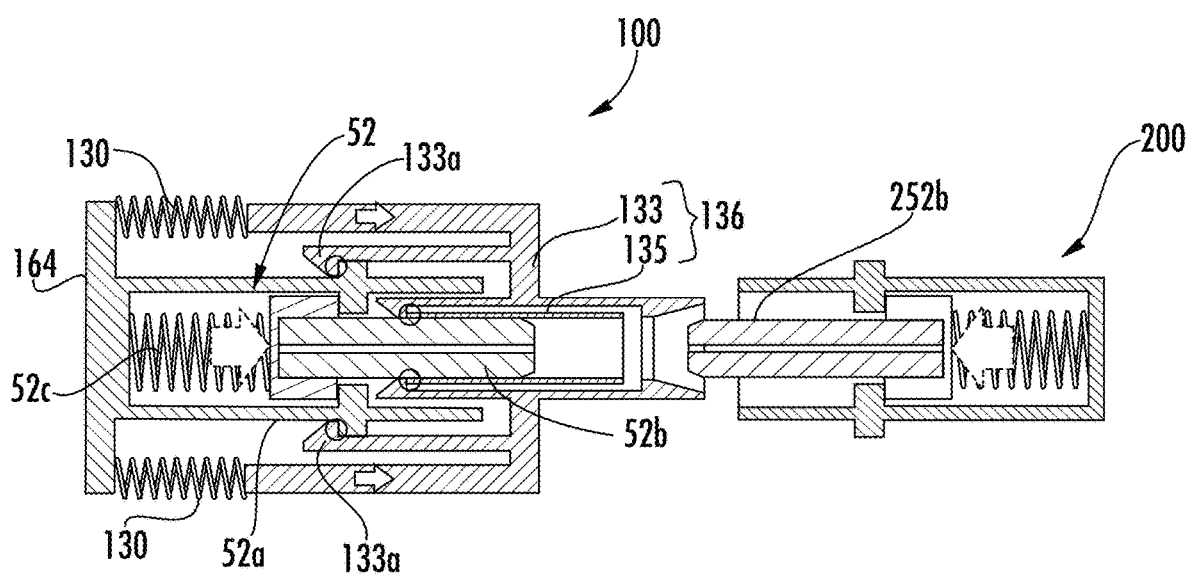
FIG. 8 is a schematic representation of the fiber optic connector of FIG. 7 depicting alignment with a suitable mating connector.
Figure 9:
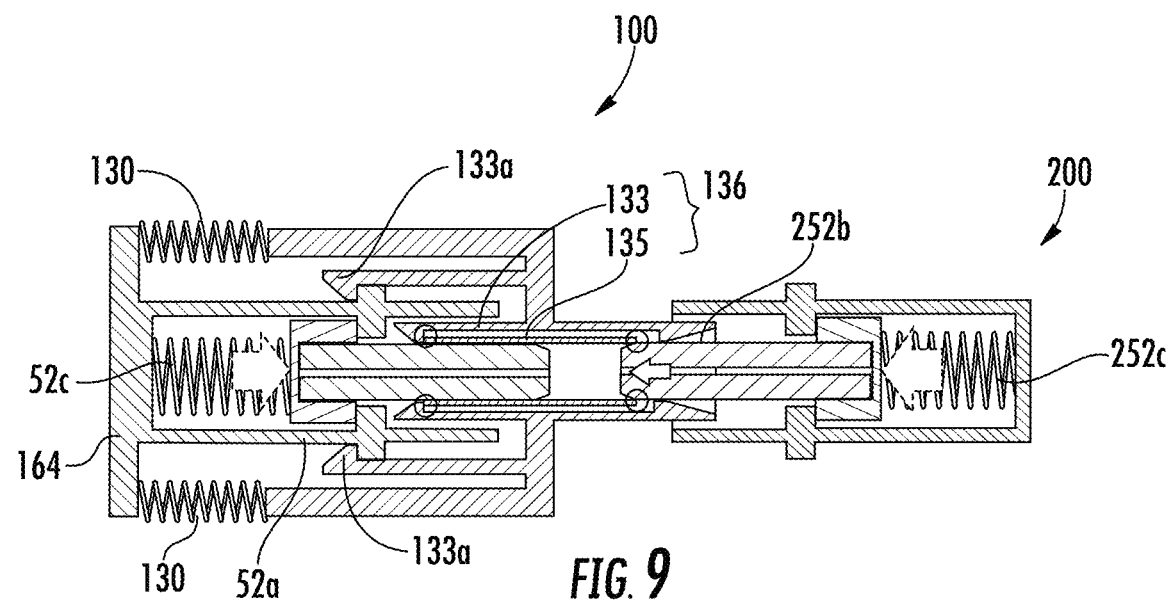
FIG. 9 is a schematic representation of the fiber optic connector and the mating connector of FIG. 8 during mating with the mating ferrule first making contact with the ferrule sleeve in the housing of the connector sleeve assembly.

FIG. 8 is a schematic representation of the assembled fiber optic connector 100 depicted in alignment with a suitable mating connector 200, which is shown schematically. FIG. 9 is a schematic representation of the fiber optic connector 100 and the mating connector 200 of FIG. 8 showing the ferrule 252b making first contact with the ferrule sleeve 135 in the housing 133 of connector sleeve assembly 136.

When the ferrule sleeve 135 is pushed to the left due to the ferrule sleeve overcoming the friction force, the one or more balancing resilient members 130 effectively acts as a stop formed inside the cavity and inhibits a worst case scenario for ferrule displacement. The worst case ferrule displacement would occur if the force of the spring 52c of connector assembly 52 and the friction of the ferrule sleeve both oppose the spring 252c of the mating connector 200, which force difference would delegate the ferrule retraction and extra fiber accumulation to the mating connector 200. Thus, when the one or more balancing resilient members 130 having a predetermined resilient force that is greater than the friction force required for displacement of a ferrule 52b of the connector assembly 52 within the ferrule sleeve 135, the worst case scenario is inhibited and fiber optic connector performance is preserved.

Figure 10:
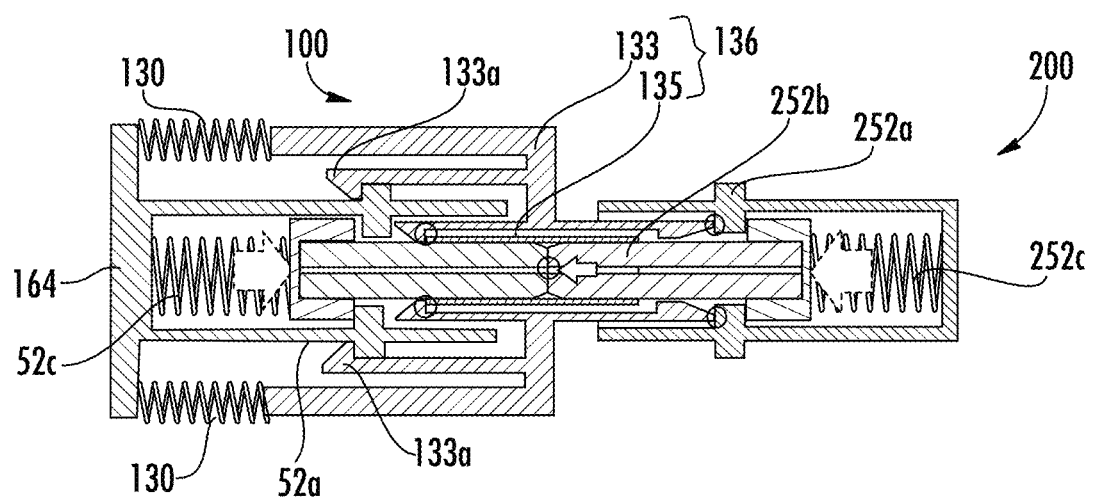
FIG. 10 is a schematic representation of the fiber optic connector and the mating connector of FIG. 9 during mating with the mating ferrules of the respective connectors make contact with the ferrule sleeve.
Figure 11:
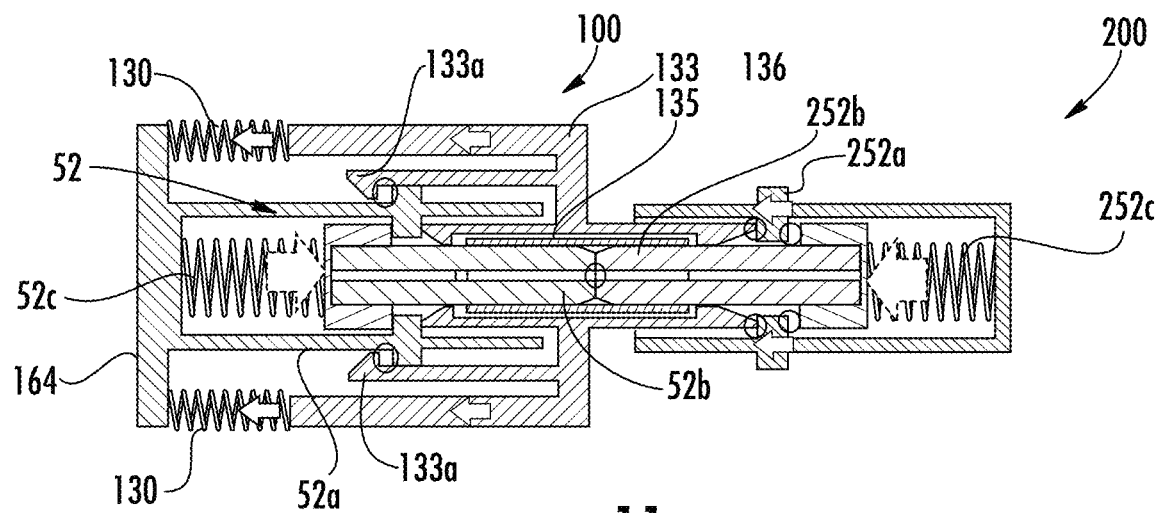
FIG. 11 is a schematic representation of the fiber optic connector and the mating connector of FIG. 10 during mating upon further insertion of the mating connector and transferring force to push the adapter sleeve so that forces are transferred to the biasing resilient member as represented by the arrows pointing to the left and providing ferrule retraction balancing.

As schematically depicted in FIGS. 10 and 11, the contact between the mating end faces of ferrules 52b and 252b occurs at about the same time that the mating connector 200 meets the hard stop within the connector sleeve assembly 136 of fiber optic connector 100. For explanation purposes, the effect of the one or more balancing resilient members 130, it is assumed that the ferrule sleeve 135 is fully repositioned until axially supported by the housing 135. With the formed resistance from the ferrule sleeve 135 friction combined with the spring 52c of connector assembly 52, the mating ferrule 252b overcomes the friction force until the mating end faces of ferrules 52b and 252b form physical contact.

The one or more balancing resilient members 130 are selected to provide the predetermined resilient member force that is greater than the friction force required for displacement of the ferrule 52b within ferrule sleeve 135 and inhibits a worst case scenario.

Figure 12:
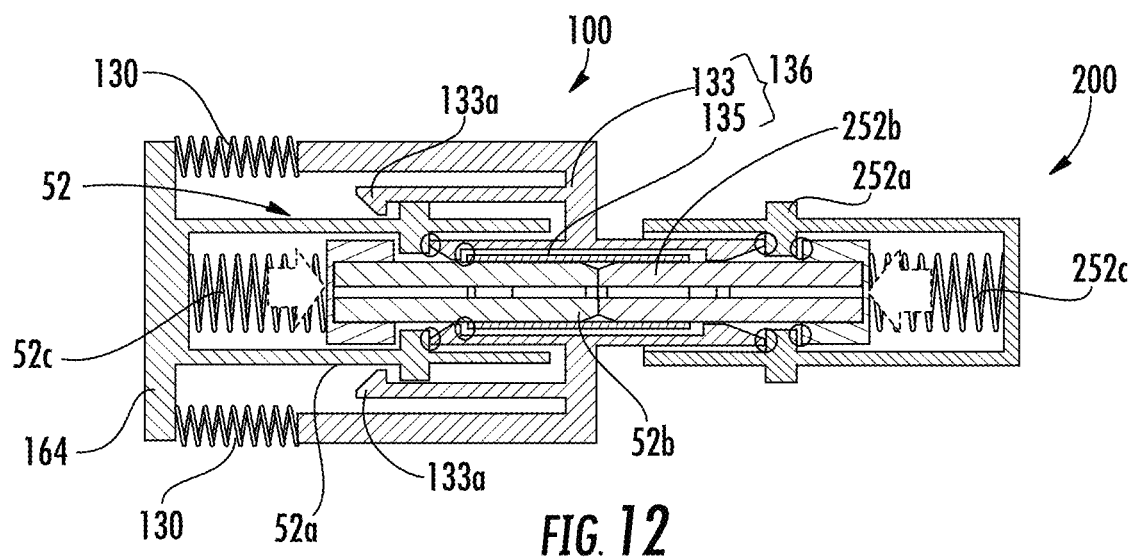
FIG. 12 is a schematic representation of the fiber optic connector and the mating connector of FIG. 11 upon completion of mating depicting the fiber optic connector a biasing resilient member having a predetermined resilient force that is greater than the friction force required for displacement of the sleeve and providing ferrule retraction balancing.

FIG. 11 depicts that as the contact occurs between the housing 252a of mating connector 200 the full force transfer may occur and FIG. 12 the completion of mating, which occurs in quick succession, but are illustrated separately for explanation. During mating and further insertion of mating connector 200 the transferring force pushes the adapter sleeve assembly so that forces are transferred to the one or more biasing resilient member 130 as represented by the arrows pointing to the left and providing ferrule retraction balancing. The one or more balancing resilient members 130 can be overcome once the forces exceed the predetermined resilient force such as 5 Newtons or greater. At this point, both ferrules 52b, 252b form a unit with the ferrule sleeve 135 based on the encountered friction. As the housing 135 is displaced, it removes axial contact between the ferrule sleeve 135 and housing 135 as depicted in FIG. 1I. With the axial support of the ferrule sleeve 133 removed, only frictional forces within the formed ferrule 52b/ferrule sleeve 135/ferrule 252b sub-assembly and as such these frictional forces are not effective regarding the balancing of the springs 52c, 252c that axially load respective ferrules 52b, 252b for physical contact.

FIG. 12 depicts the completion of mating between fiber optic connector 100 and mating connector 200. By removing the frictional forces of the ferrule sleeve 135 from the equation, the mating of the fiber optic connector 100 and mating connector 200 act as a normal system with the balancing of the springs 52c, 252c for axially loading the respective ferrules 52b, 252b with physical contact and preserving optical performance.

It is noted that optical performance of a fiber optic connector may also depend on the fiber optic cable design being used. The hard stop between the mating connector housings and the connector sleeve assembly limits the amount of axial interference and determines the maximum extra optical fiber length generated in the connectors due to ferrule retraction. The ability to absorb extra optical fiber length in the connector may depend on many factors like the fiber optic cable construction, size of the cavity housing the optical fiber, but often is a relatively small value such as on the order of a few hundred microns and may impact optical performance.

Figure 13:
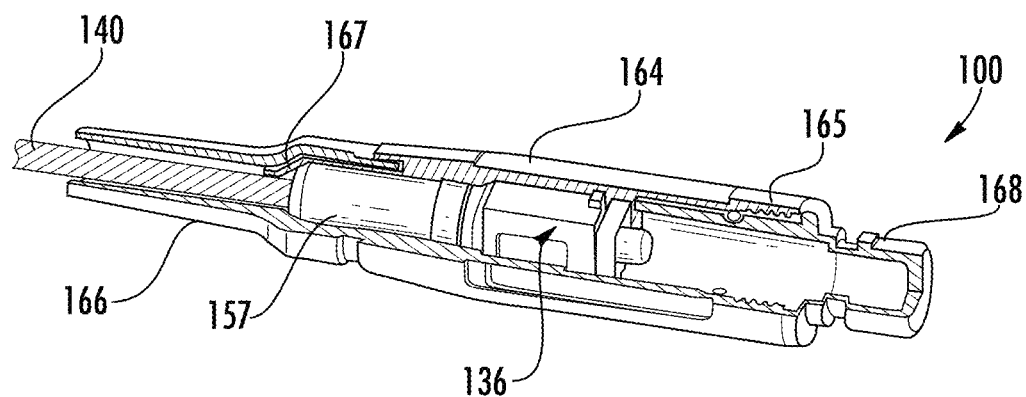
FIG. 13 is a partial-sectional view thru the outer housing of an explanatory fiber optic connector having a connector assembly, a connector sleeve assembly and a balancing resilient member according to the concepts disclosed herein.
Figure 14:
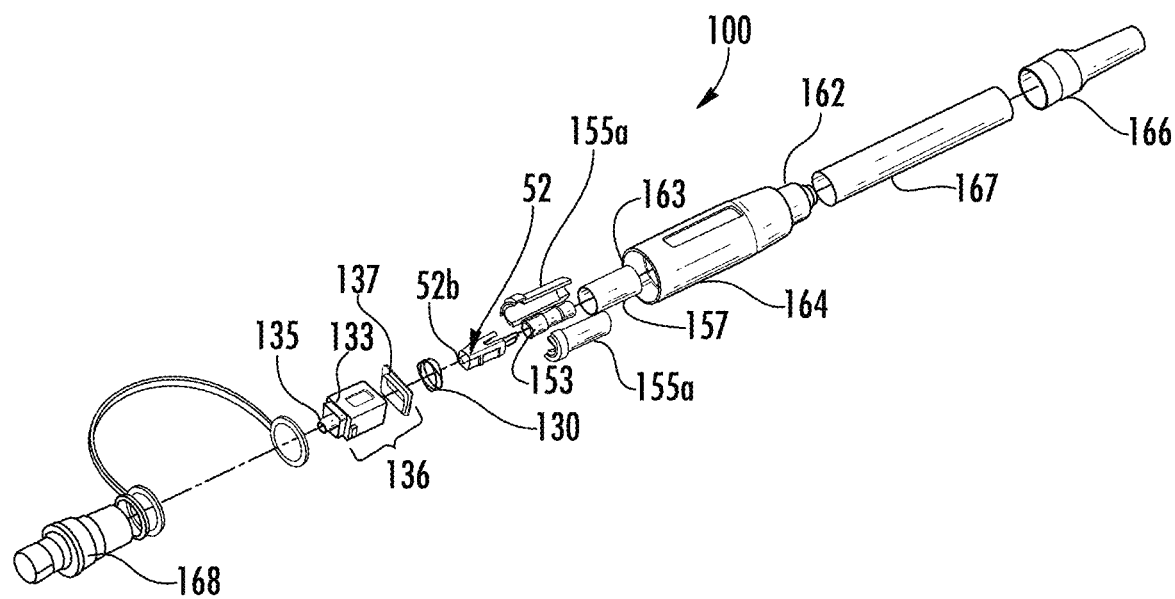
FIG. 14 is an exploded view of the explanatory fiber optic connector of FIG. 13.
Figure 15:
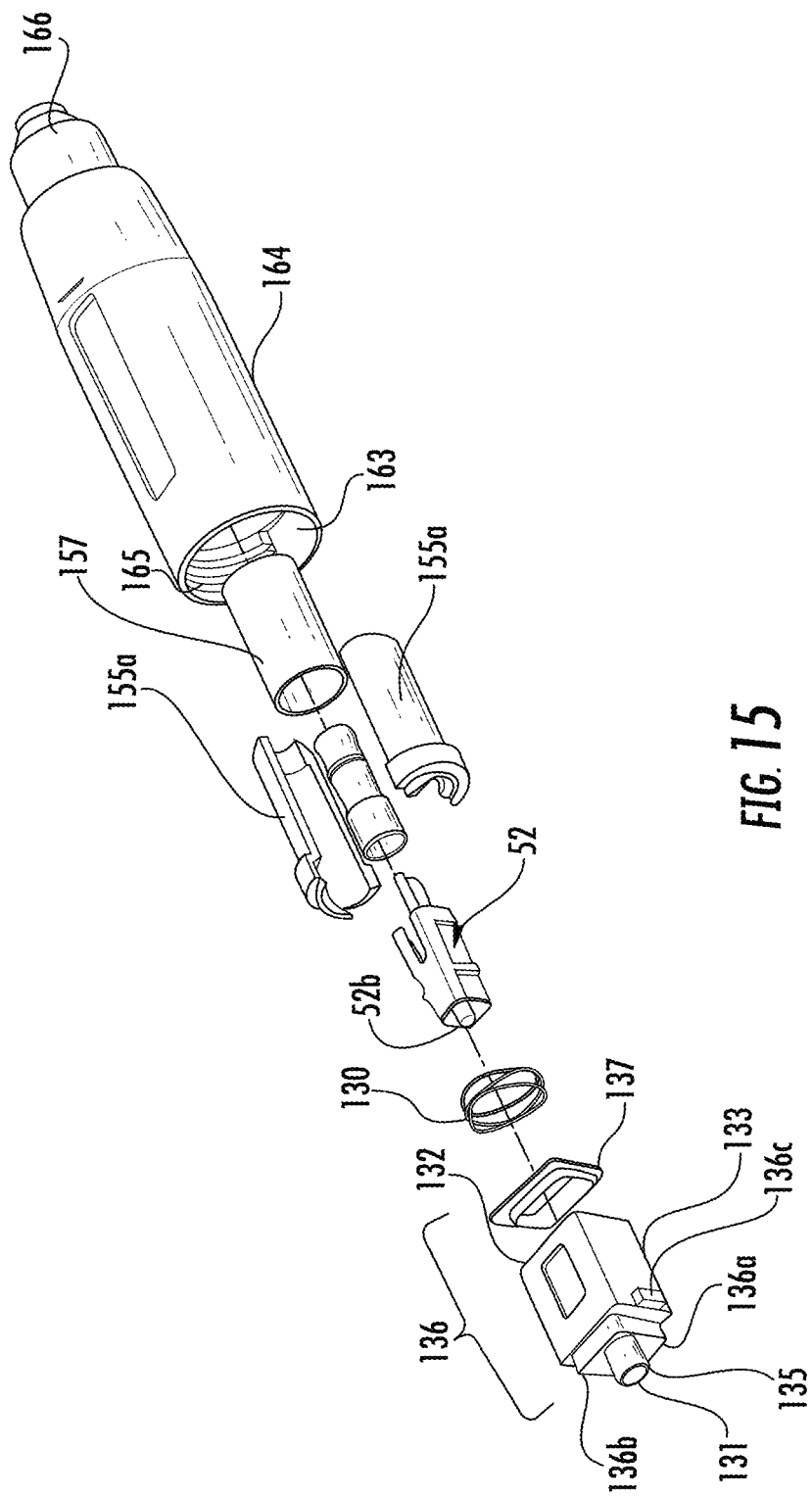
FIG. 15 is a partially exploded view of the explanatory fiber optic connector of FIG. 13.

The concepts of a ferrule-based fiber optic connector having a ferrule retraction balancing characteristic for inhibiting ferrule displacement may be embodied in many different fiber optic connector configurations. The following fiber optic connectors using the concepts disclosed is for explanatory purposes and are suited for mating directly with an OptiTap plug connector similar that shown in FIGS. 1A-1C. By way of description the fiber optic connector 100 depicted in FIGS. 13-15 is a first embodiment of an in-line female hardened connector and a fiber optic connector 100' is a second embodiment of an in-line female hardened connector according to the concepts disclosed herein. Of course, other fiber optic connectors are possible using the concepts of the claims such as being use with other types of hardened connectors.

Figure 16:
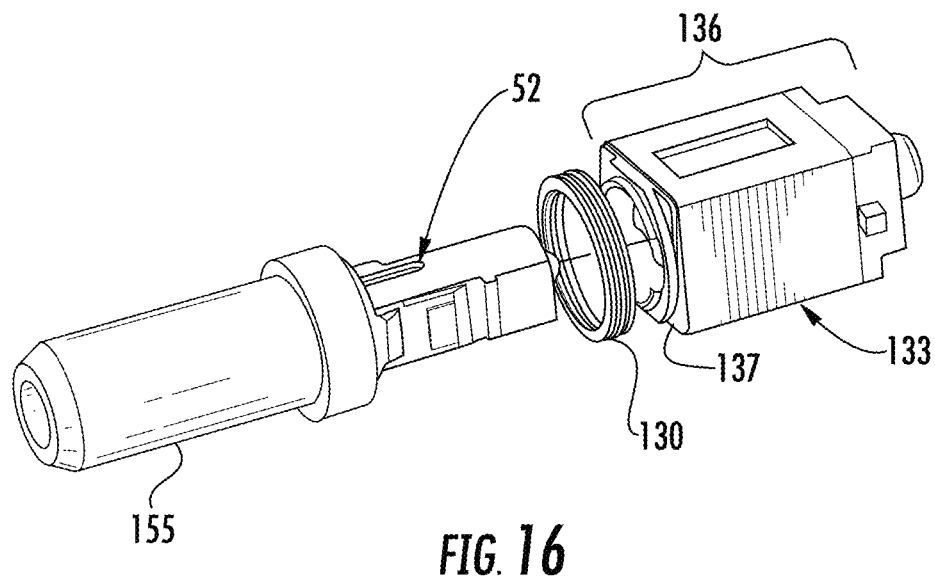
FIG. 16 is a partially assembled view of a sub-assembly of the fiber optic connector of FIG. 13.

FIGS. 13 and 16 depict fiber optic connectors 100 and 100' being portions of respective cable assemblies further including a fiber optic cable 140 attached to the respective connectors. Fiber optic cable 140 may comprise one or more optical fibers, one or more tensile elements such as strength members or strength components, and a cable jacket, but other suitable components are possible. The tensile elements of fiber optic cable 140 are typically secured to a cable attachment region of fiber optic connector 100.

Figure 17:
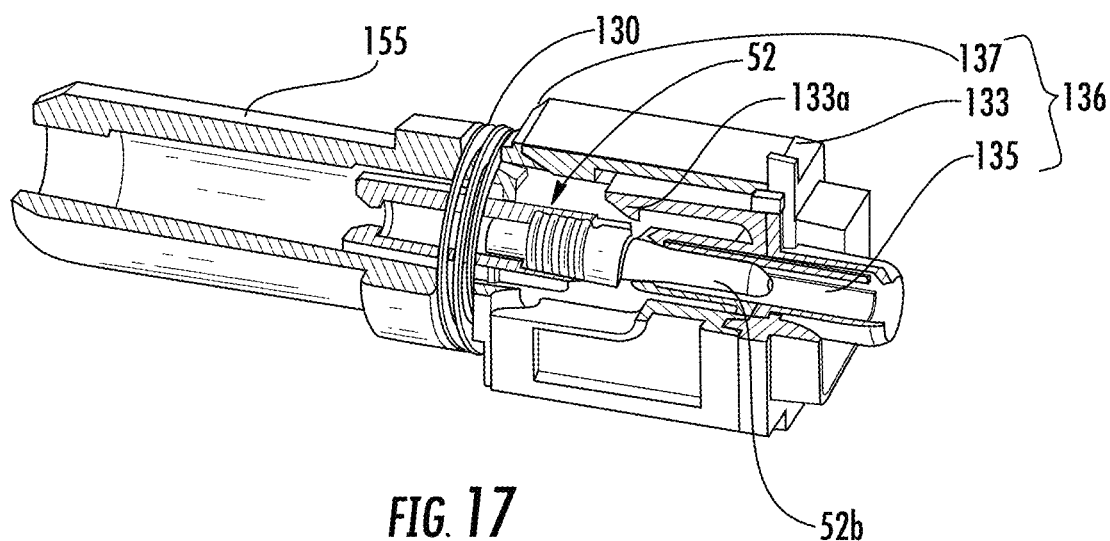
FIG. 17 is a sectional view of a sub-assembly of FIG. 16 showing further details.

FIG. 13 is a partial-sectional view thru a housing 164 of an explanatory fiber optic connector 100 having a connector assembly 52, a connector sleeve assembly 136 and one or more balancing resilient members 130 according to the concepts disclosed herein. FIGS. 14 and 15 respectively depict exploded views of the fiber optic connector 100. FIGS. 16 and 17 respectively depict a partial exploded view and an assembled view of a sub-assembly of fiber optic connector 100 to show further details of this embodiment.

FIG. 13 depicts fiber optic connector 100 having a dust cap 168 attached thereto via female coupling housing 164. The female coupling housing 164 is sized for receiving the male plug connector 5 within the front end opening for direct optical mating. Fiber optic connector 100 has a relatively small form factor and aligns the plug connector 5 in the proper orientation so it may only mates in one direction. Further, the optical coupling between the fiber optic connector 100 and the plug connector 5 is environmentally sealed. Additionally, fiber optic connector 100 may be optically coupled and uncoupled with plug connector 5 as desired.

Fiber optic connector 100 comprises connector assembly 52, a body 155 having at least one shell 155a (as shown two shells 155a that form the body), an optional crimp band 157, connector sleeve assembly 136, and female coupling housing 164. Fiber optic connector 100 may also comprise other optionally components such as a cable boot 166, a heat shrink tube 167, a second crimp band 153, and/or one or more O-rings. For complexity reduction and simplification, the fiber optic connector 100 can use many of the same parts as the OptiTap® plug connector 5 or other standard parts as desired; however, certain components are specific to fiber optic connector 100. By way of example, fiber optic connector 100 may comprise an industry standard SC type connector assembly 52 or the like having a connector body 52a, a ferrule 52b in a ferrule holder (not visible), a spring 52c (not visible), and a spring push 52d. However, any of the embodiments can use any suitable connector assembly such as a SC or a LC connector assembly having a ferrule and a connector housing along with other suitable components.

Although, the term body is shown with a crimp band the body does not require crimp or crimp band and may use other securing means such as adhesive or the like for securing the shells 155a together. The crimp band 157 may also be used for securing the tensile elements of fiber optic cable 140. For instance, the tensile elements may be a plurality of tensile yarns attached between an outer barrel of body 155 and crimp band 157. In other embodiments, one or more strength components such as GRP rods maybe secured to the cable attachment region of the fiber optic connector such as between the shells 155a. The optional second crimp band 153 may be used for cables or constructions where it is desired to strain-relieve the fiber optic cable directly to the connector assembly 52. By way of example, tensile elements such as aramid yarns may be secured to the connector assembly 52 using second crimp band 153 for providing strain-relief. Fiber optic connectors may also include a dust cap 168, but other suitable configurations are possible using fewer or more components. For instance, fiber optic connector 100 may also include an optional lanyard (not numbered) for the dust cap 168 as desired so it is prevented from being lost or separated from the assembly.

Generally speaking, most of the components of fiber optic connector 100 are formed from a suitable polymer, but other materials such as metal are possible. In one example, the polymer is a UV stabilized polymer such as ULTEM 2210 available from GE Plastics if the component is exposed to the elements; however, other suitable polymer materials are possible. For instance, stainless steel or any other suitable metal may be used for various components as desired.

The housing 133 of connector sleeve assembly 136 may be formed as a single component or formed as an assembly of more than one component. In this embodiment, the housing of 133 connector sleeve assembly 136 is formed from several components as best depicted in FIG. 17, thereby making the features of the connector sleeve easier manufacture. However, the concepts disclosed herein may be used with any suitable connector sleeve assembly. The housing 133 also includes latches 133a for securing connector assembly 52, but the latches 133a are not visible in the FIGS.

The housing 133 of connector sleeve assembly 136 has a through passageway from a first end 131 to a second end 132 for receiving ferrule sleeve 135 in a loosely captive manner and aligning respective ferrules of the fiber optic connector 100 and the mating connector as discussed herein. Specifically, when assembled, connector sleeve assembly 136 fits within female coupling housing 164 and is used for aligning ferrule 52b of the fiber optic connector 100 with the corresponding ferrule of the plug connector 5. Connector sleeve assembly 136 comprises housing 133, ferrule sleeve 135, and a spring seat 137.

As depicted, ferrule sleeve 135 has a portion disposed within housing 133 and is secured therein by spring seat 137. Specifically, a flange (not numbered) of ferrule sleeve 135 is aligned to housing 133 using a recess portion of housing 133 and spring seat 137 is attached to the housing 133 for capturing and securing the flange of the ferrule sleeve 135 between the housing 133 and spring seat 137. In this embodiment, balancing resilient member 130 is a wave spring having one end seated on the spring seat 137 and the other end seated on the front portion of body 155 for biasing the housing 133 to a forward position. As best shown in FIGS. 16 and 17, a portion of the balancing resilient member 130 is disposed radially outward of the connector assembly 52 when the connector is assembled. However, other arrangements or configurations for the balancing resilient member are possible according to the concepts disclosed herein.

In addition to the connector sleeve assembly 136 having a passageway 136a between the first end 131 and the second end 132 it also includes one or more connector sleeve orientation features. Connector sleeve orientation features can have many different suitable constructions such as lugs, tabs, openings, etc. for cooperating with the one or more coupling housing orientation features on the female coupling housing. In the embodiment illustrated, connector sleeve assembly 136 includes a first lug 136b and a second lug 136c for fitting the connector sleeve assembly 136 into the female coupling housing 164. Stated another way, connector sleeve assembly 136 fits into female coupling housing 164 in only one orientation using first tab 136b and second tab 136c having different shapes as discussed below.

Figure 18:
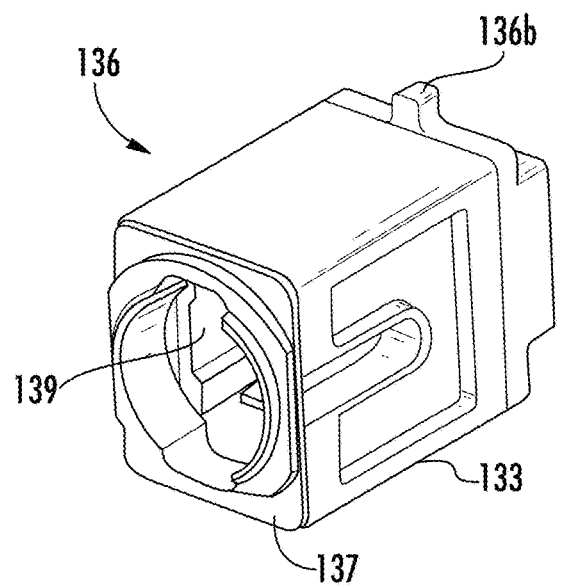
FIGS. 18 and 19 depict further details of the housing and spring seat of the connector sleeve assembly of the sub-assembly of the fiber optic connector of FIGS. 16 and 17.
Figure 19:
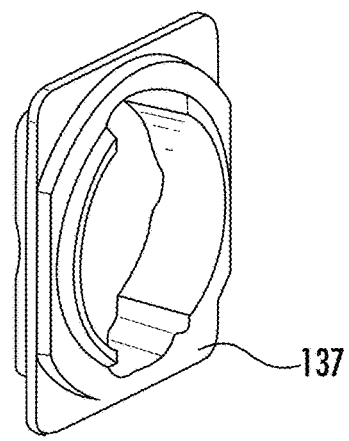

Connector sleeve assembly 136 optionally includes an orientation rail 139 (FIG. 18) for allowing connector assembly 52 of female hardened plug connector 150 to be assembled into the connector sleeve assembly 136 in only a single orientation. Orientation rail 139 has a profile that only allows a narrow end of connector body 52a to abut the orientation rail 139 during assembly.

Figure 20:
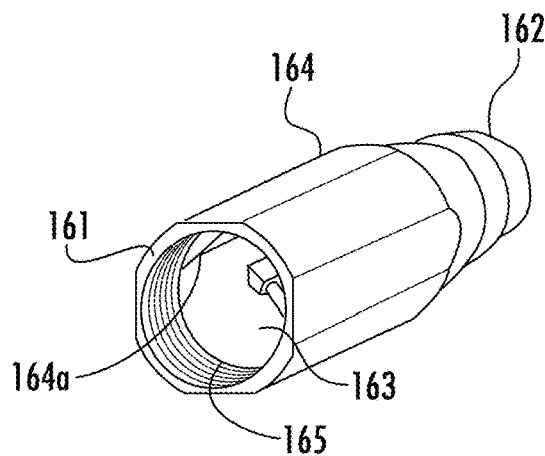
FIGS. 20-22 depict further details of the outer housing of the fiber optic connector of FIG. 13.
Figure 21:
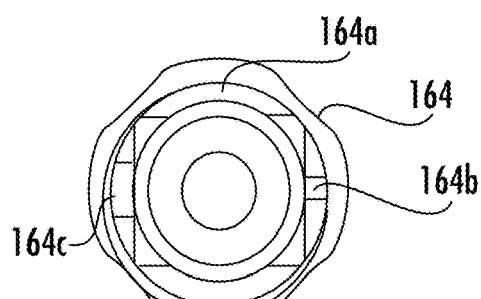
Figure 22:
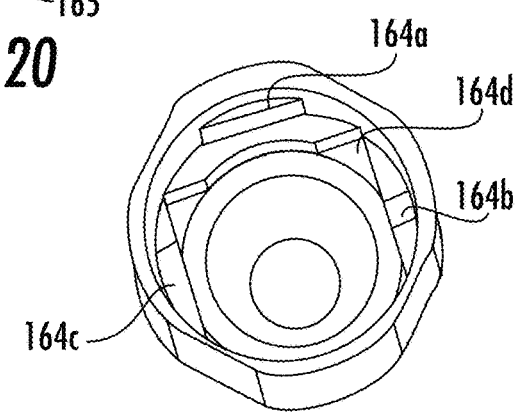
Figure 23:
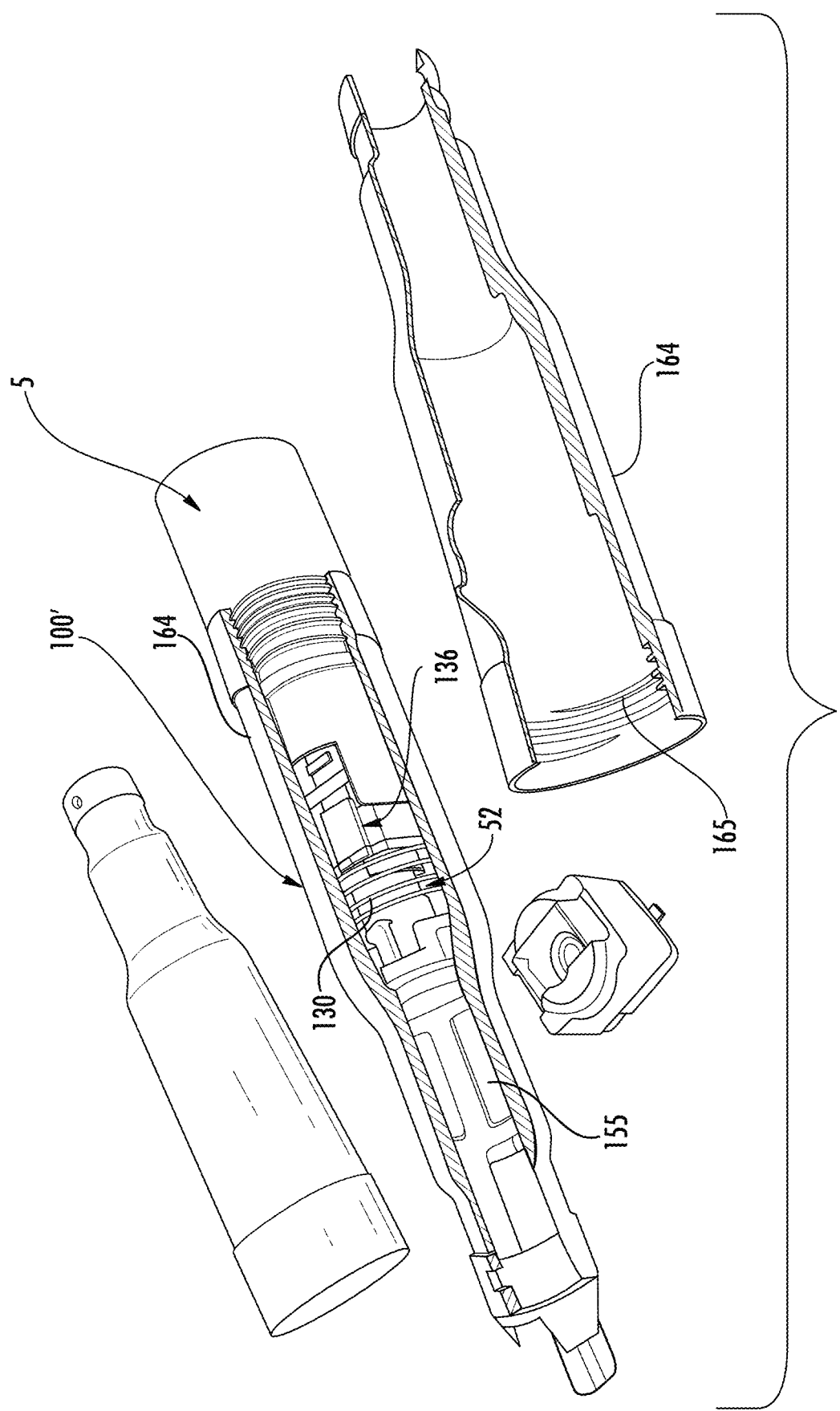
FIG. 23 is a partial-sectional view thru the outer housing of another explanatory fiber optic connector having a connector assembly, a connector sleeve assembly and a balancing resilient member according to the concepts disclosed herein, and which is mated to an OptiTap® male plug connector similar that shown in FIGS. 1A-1C.

Housing 164 may have any suitable construction for the fiber optic connector using the concepts disclosed herein. As best shown in FIGS. 20-22, female coupling housing 164 has an elongate structure with a passageway 163 extending from the opening at a front end 161 to a rear end 162 and sized so that the shroud of the plug connector 5 fits into the front end 161 of passageway 163 when properly aligned. Consequently, plug connector 5 may be directly mated with the fiber optic connector 100 for making an optical connection therebetween. As shown, female coupling housing 164 includes a first portion at the front end that includes the internal attachment feature such as internal threads 165 that cooperate directly with the complimentary external threads of plug connector 5. Once the plug connector 5 is attached to the fiber optic connector 100 the assembly is suitable for making an optical connection therebetween.

Female coupling housing 164 includes features for aligning and securing connector sleeve assembly 136 along with alignment features for correctly orientating plug connector 5. In one embodiment, female coupling housing 164 includes a stop ledge 164a integrally formed in a side wall (i.e., disposed on the side wall) that is disposed rearward of internal threads 165. Stop ledge 164a is configured so that it only allows the shroud of plug connector 5 to fully seat within the female coupling housing 164 in one orientation for keying the optical coupling. In other words, the shroud of the plug connector 5 has alignment fingers having different shapes and the stop ledge 164a only allows the plug connector 5 to fully seat for optical coupling in one orientation by preventing insertion of the larger alignment finger into the female coupling housing 164 past the stop ledge 164a. Female coupling housing 164 also includes a shelf (not visible) within the passageway and disposed rearward of the stop ledge 164a. Shelf 164d has a complementary shape for receiving connector sleeve assembly 136 and includes a first retention feature 164b and a second retention feature 164c. Shelf 164d has a generally rectangular shape that cooperates with the generally rectangular shape of connector sleeve assembly 136 so that it fits within the passageway of female coupling housing 164. First retention feature 164b and second retention feature 164c have different sizes that cooperate with tabs 136b,136c disposed on connector sleeve assembly 136 so that it may only fully seat into shelf 164d in one orientation. Further, the stop ledge 164a has a specific orientation relative to first retention feature 164b and second retention feature 164c.

When fully assembled the body 155 fits into female coupling housing 164 and is keyed to direct the insertion of the same into the coupling housing 164 in the correct orientation. In this case, shells 155a include planar surfaces on opposite sides of body 155 to inhibit relative rotation between body 155 and female coupling housing 164. In other embodiments, the body 155 may be keyed to the female coupling housing 164 using other configurations such as a complementary protrusion/groove or the like.

Rear end 162 of housing 164 includes second portion (not numbered) having a reduced cross-section. The second portion is used for securing heat shrink tubing 167 for providing environmental protection between the housing 164 and the fiber optic cable 140 and weatherproofing the cable assembly. The other end of heat shrink tubing 167 is disposed about a portion of the cable jacket, thereby inhibiting water from entering fiber optic connector 100. Further, the second portion allows for the attachment of boot 166 to the rear end 162 of coupling housing 164. After the heat shrink tubing 167 is attached, boot 166 may be slid over heat shrink tubing 167. Specifically, boot 166 may be positioned over the shrink tubing 167 at rear end 162 of female coupling housing 164 for providing further bending strain relief for the cable assembly.

Boot 166 may be formed from a flexible material such as KRAYTON or the like. Heat shrink tubing 167 and boot 166 generally inhibit kinking and provide bending strain relief to the cable 140 near fiber optic connector 100. Boot 166 has a longitudinal passageway (not visible) and may have a stepped profile therethrough. The first end of the boot passageway is sized to fit over the heat shrink tubing 167. The first end of the boot passageway has a stepped down portion sized for cable 140 or other suitable cable that may be used and the heat shrink tubing 167 and acts as stop for indicating that the boot is fully seated. Dust cap 168 has external threads for engaging the internal threads of female coupling housing 164 for attachment and thereby inhibit dirt and debris from entering the fiber optic connector 100 via the front end 161 of female coupling housing 164. Moreover, the dust cap 168 may include an O-ring for providing a weatherproof seal between fiber optic connector 100 and dust cap 168 when installed.

FIG. 16 is a partial-sectional view thru the outer housing of another explanatory fiber optic connector 100'. Fiber optic connector 100' is similar to connector 100 and comprises a connector assembly 52, a connector sleeve assembly 136 and a balancing resilient member 130 according to the concepts disclosed herein, but fiber optic connector 100' has a construction that is different from fiber optic connector 100.

Specifically, fiber optic connector 100' using a different body 155' with a different fiber optic cable 140. Instead of the shells 155a used in fiber optic connector 100, fiber optic connector 100' has a monolithic body 155' that has the fiber optic cable inserted into and secured using an adhesive. Additionally, the balancing resilient member 130 of fiber optic connector 100' is configured as a coil spring that is seated on a portion of the fiber optic connect and housing 133 of connector sleeve assembly 136.

Figures 1A, 1B:
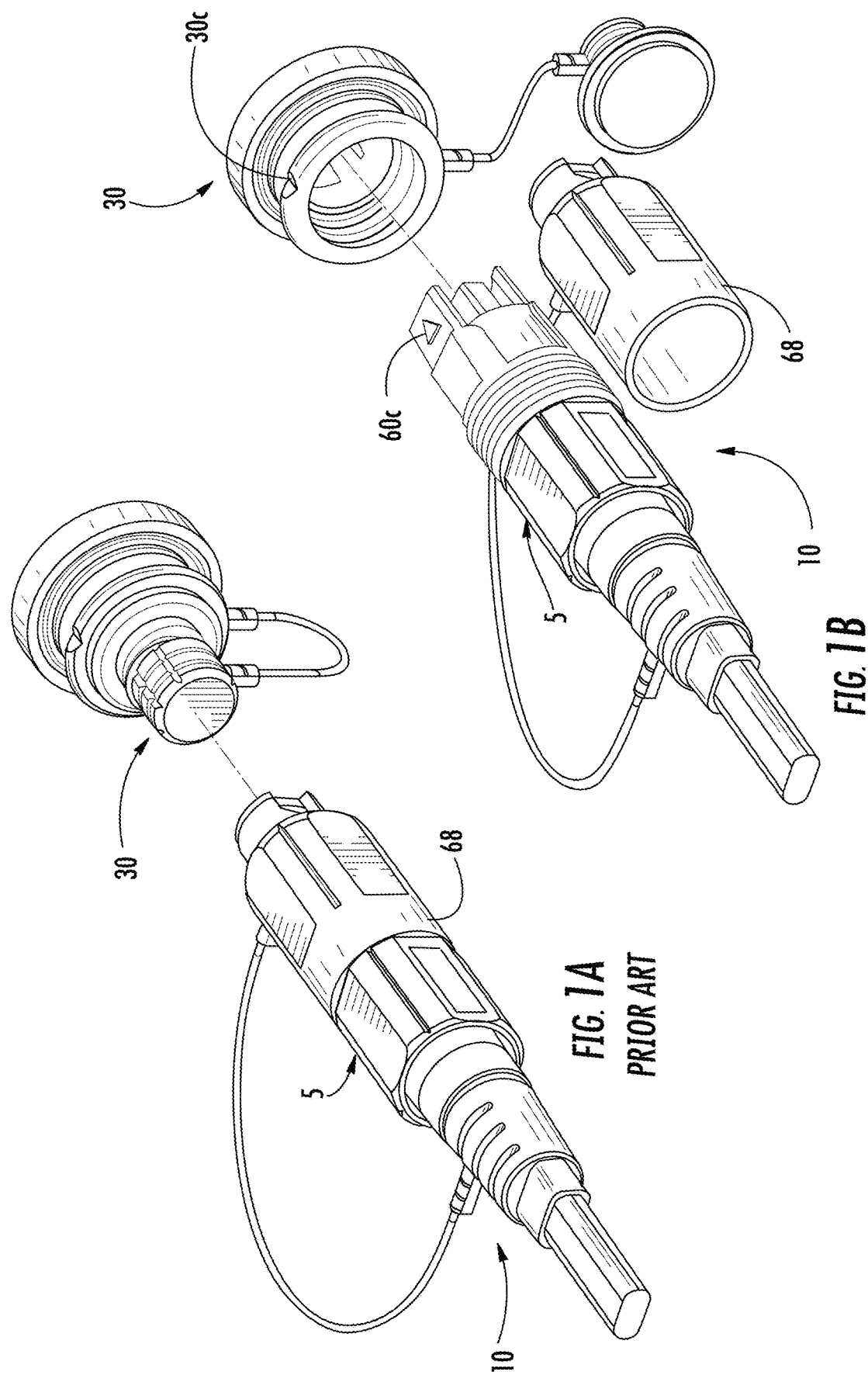
FIGS. 1A-1C show portions of a conventional preconnectorized fiber drop cable having a hardened connector such as an OptiTap® male plug connector being inserted into and connected with a conventional receptacle for alignment and mating the hardened connector with a non-hardened connector.
Figure 1C:
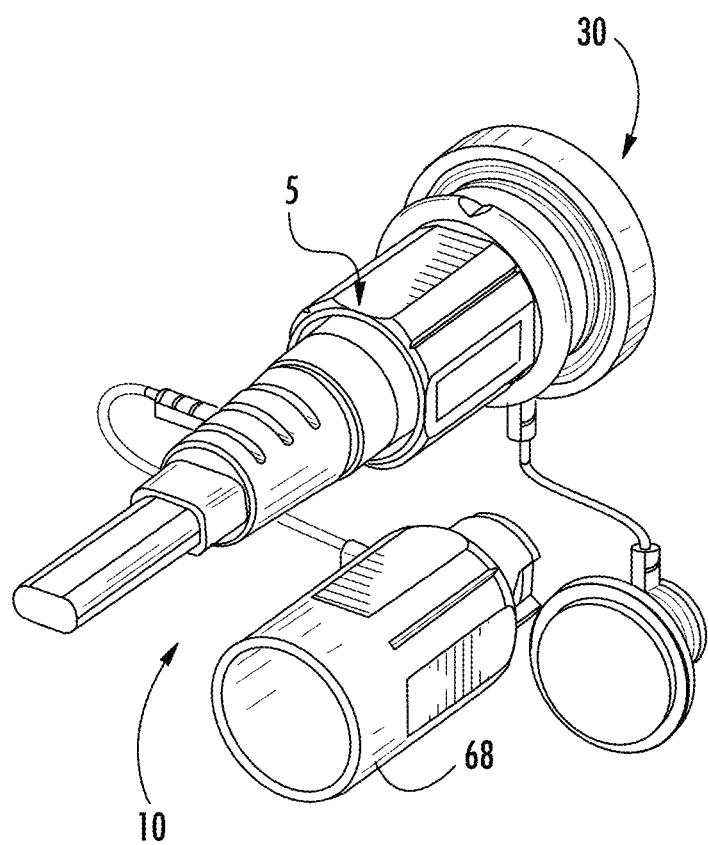

FIG. 16 depicts fiber optic connector 100' mated to a plug connector 5 similar that shown in FIGS. 1A-1C. As shown, the shroud of the male plug connector 5 has alignment fingers having different shapes and when mated the stop ledge only allows the plug connector 5 to fully seat for optical coupling in one orientation by preventing insertion of the larger alignment finger into the female coupling housing 164 past the stop ledge. In one embodiment, the correct mating orientation is marked on the female coupling housing 164 such as an alignment indicia so that the craftsman can quickly and easily mate fiber optic connector 100 with the plug connector 5. For instance, the alignment indicia may be an arrow or dot molded into the female coupling housing 164, however, other suitable indicia may be used. Thereafter, the craftsman engages the internal attachment feature 165 such as internal threads of female coupling housing 164 with the complimentary external threads of plug connector 5 for making the optical connection shown in FIG. 16.

Additionally, the optical connection is easily connected or disconnected by merely mating or unmating the plug connector 5 with the fiber optic connector 100 by threadly engaging or disengaging the coupling nut on the plug connector 5 with the attachment features 165 such as internal threads of the female coupling housing 164 of the fiber optic connector 100.

Figure 24:
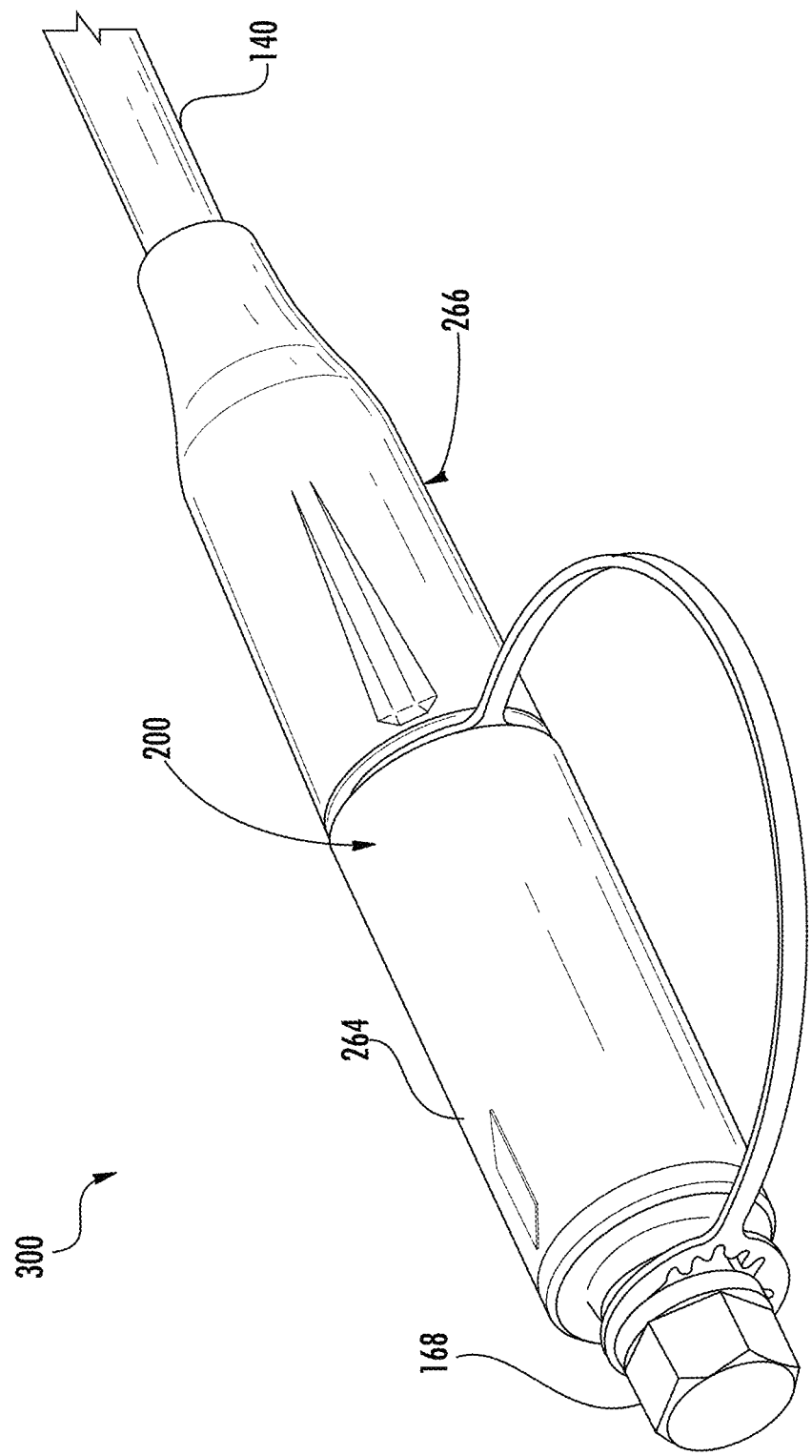
FIG. 24 is a perspective view of cable assembly having another explanatory fiber optic connector according to the concepts disclosed.

Other connector designs are possible according to the concepts disclosed for solving the issues of ferrule displacement by using a ferrule retraction balancing construction for fiber optic connectors by balancing out the forces related to the ferrule sleeve friction during assembly and mating. By way of example, FIG. 24 is a perspective view of a cable assembly 300 having another explanatory fiber optic connector 200 according to the concepts disclosed. Fiber optic connector 200 may use the same principals and concepts for the ferrule displacement balancing construction for inhibiting the loading-up of ferrule displacement within the fiber optic connector as discussed herein with respect to the other fiber optic connectors.

Figure 25:
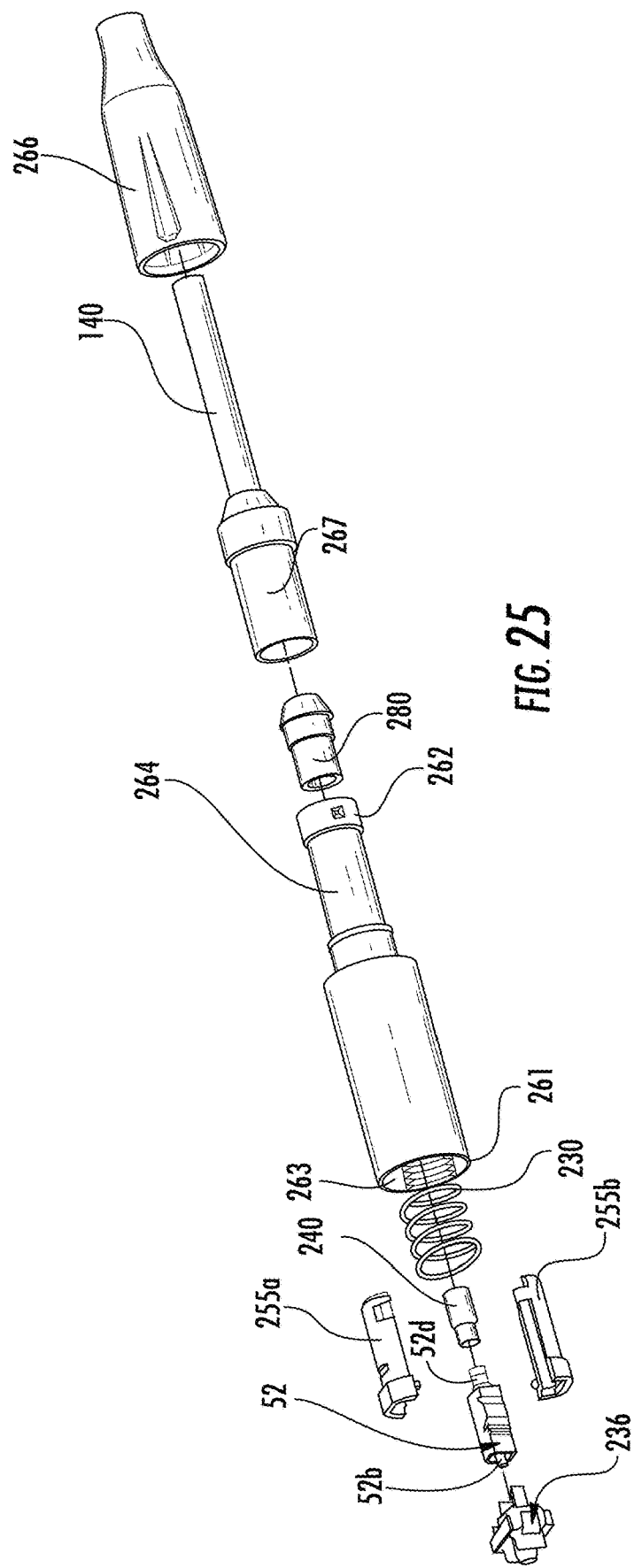
FIG. 25 is an exploded view of cable assembly of FIG. 24.
Figure 26:
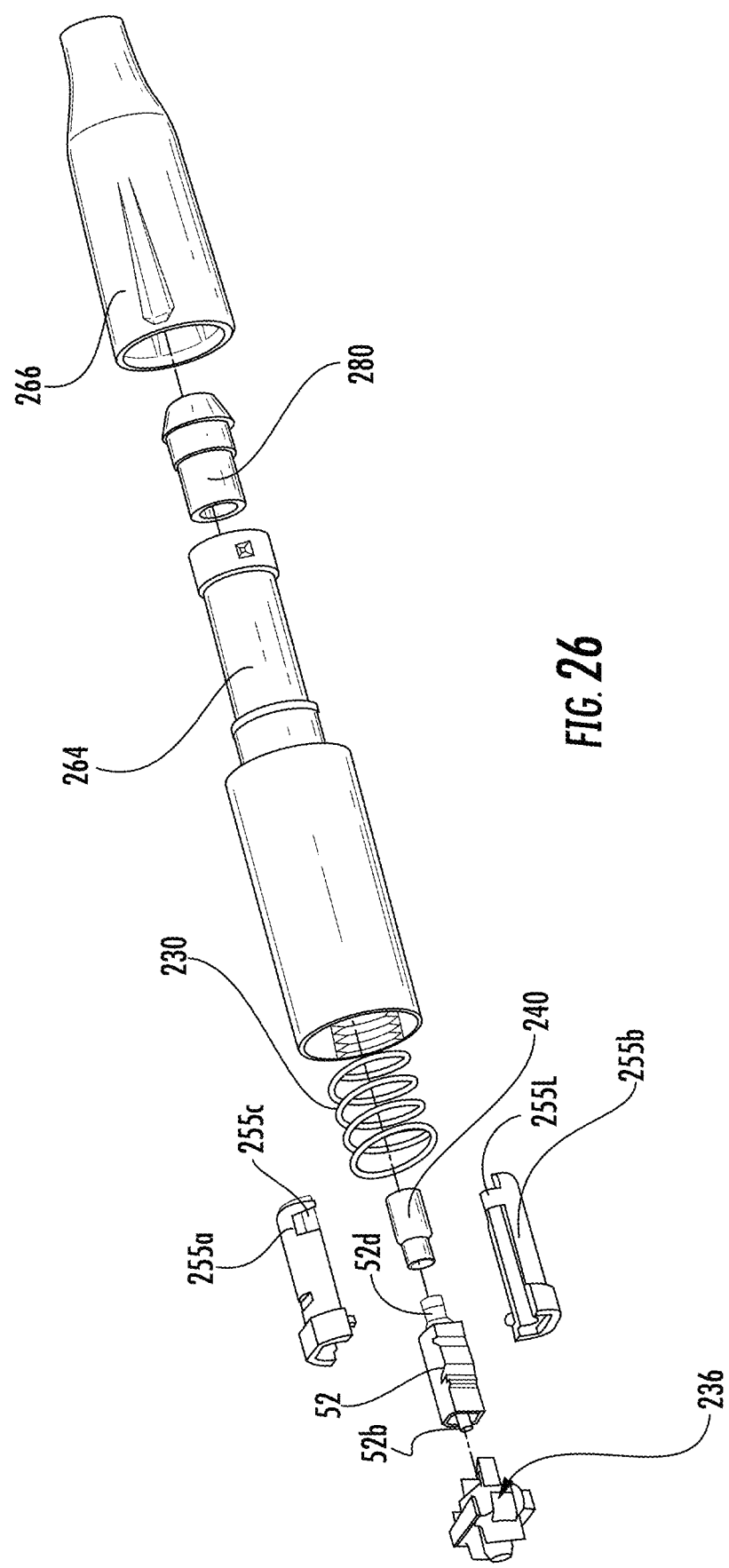
FIG. 26 is an exploded view of the fiber optic connector of FIG. 24.

FIG. 25 is a partially exploded view of the cable assembly 300 having fiber optic connector 200 that is similar to fiber optic connector 100 and FIG. 26 is a partially exploded view of connector 200. Fiber optic connector 200 uses a different and simplified connector sleeve assembly 236 compared with connector 100. Fiber optic connector 200 also has other features or modified components that improve or simplify the manufacturing or assembly for fiber optic connector 200. For instance, a first shell 255a and a second shell 255b are designed so they can snap together and the crimp band 240 strain-relieves the fiber optic cable 140 to the spring push 52d of connector assembly 52. Additionally, the female coupling housing 264 is different than female coupling housing 164 of fiber optic connector 100.

Fiber optic connector 200 comprises connector assembly 52, a connector sleeve assembly 236, and a balancing resilient member 230 for biasing the housing of connector sleeve assembly 236 to a forward position with the balancing resilient member 230 comprising a predetermined resilient force that is greater than the friction force required for the displacement of the ferrule 52b within the ferrule sleeve 135 as discussed herein. Connector assembly 52 comprises a ferrule 52b and a resilient member (not visible) that is disposed within the connector assembly as known in the art.

Figure 27:
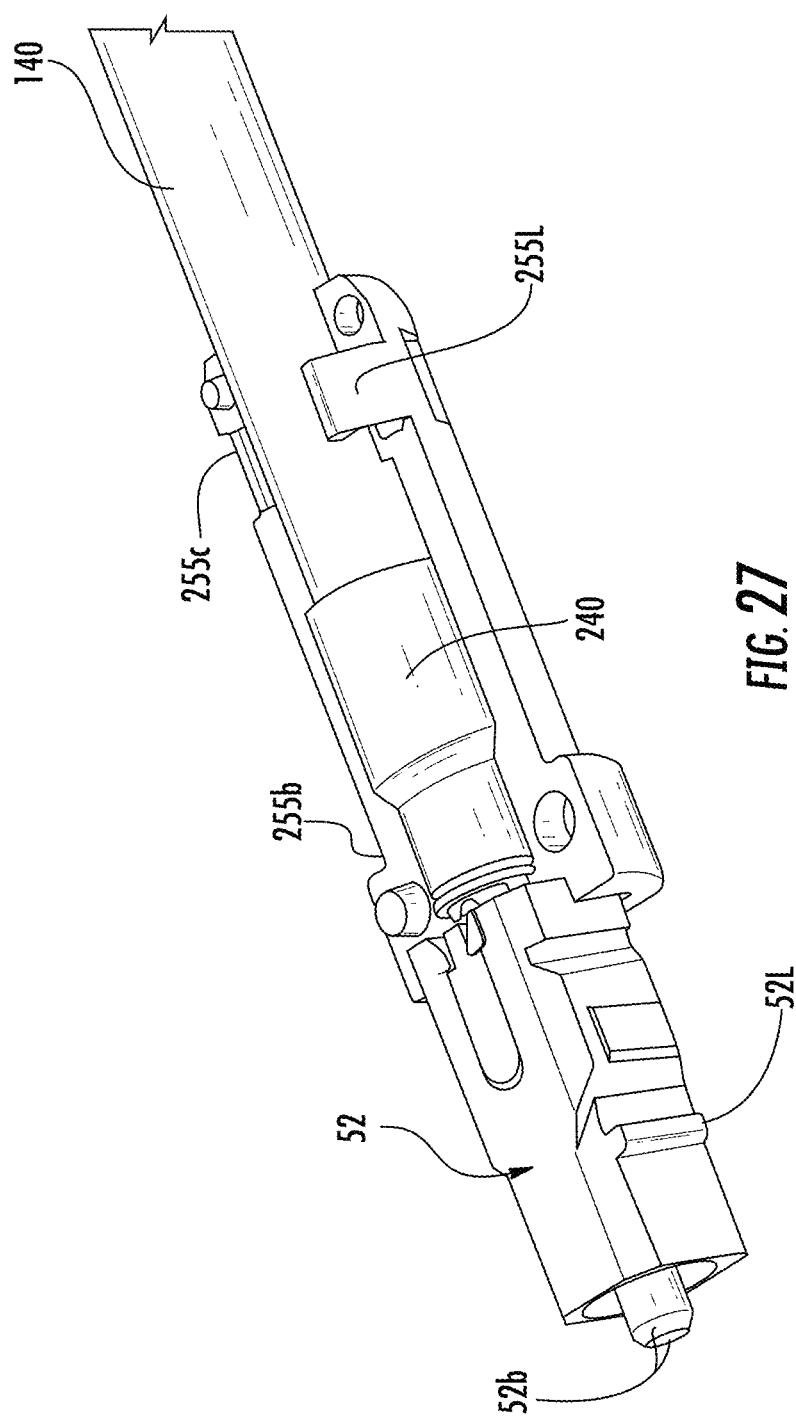
FIGS. 27 and 28 are partial assembly perspective views of the construction of the cable assembly of FIG. 24.
Figure 28:
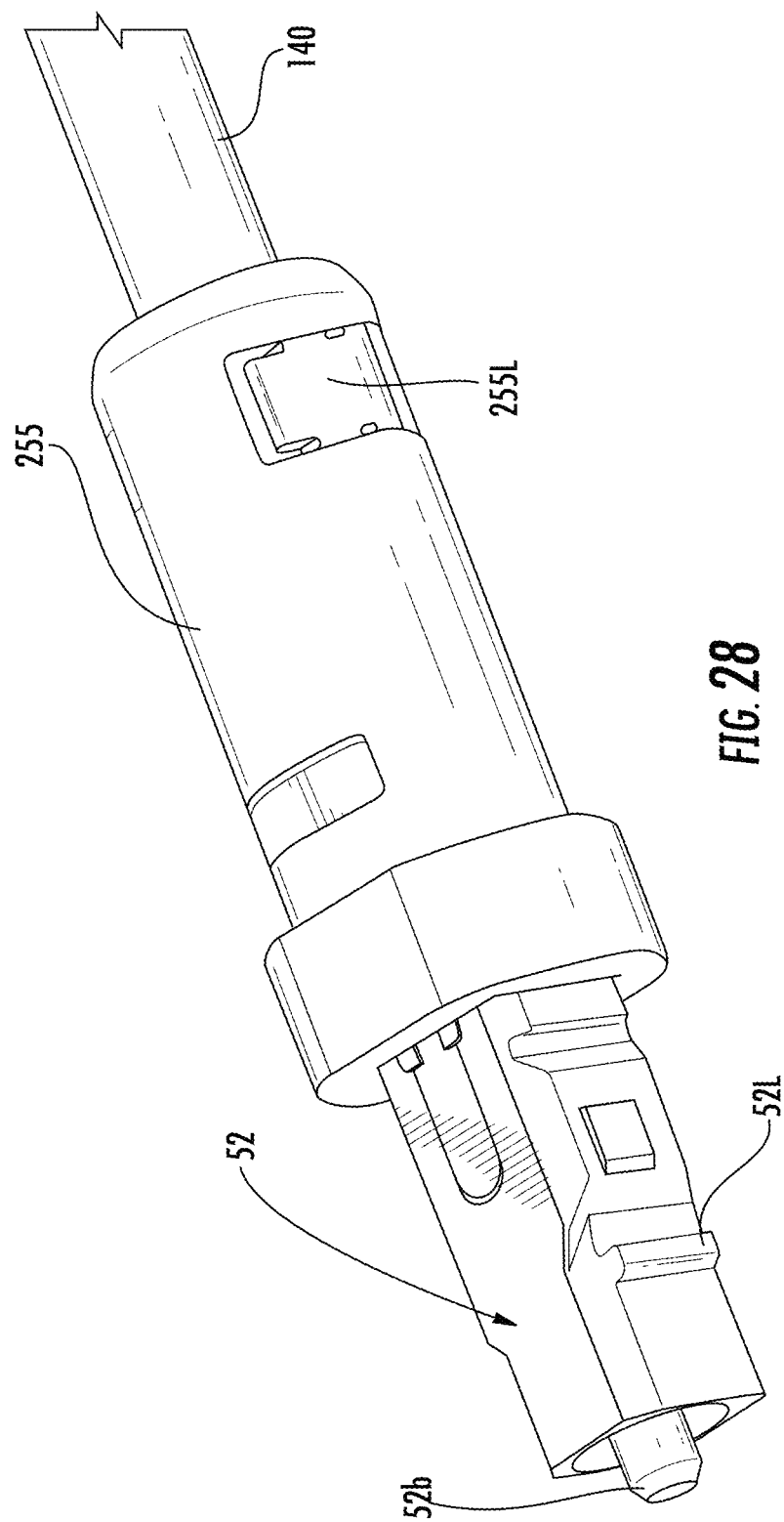

FIGS. 27 and 28 are partial assembly perspective views showing the construction of cable assembly 300. FIG. 27 is a perspective view depicting fiber optic cable 140 attached to connector assembly 52 and positioned in shell 255b. In this embodiment, cable 140 is secured to connector assembly 52 using a crimp band 240 that is attached to a portion of spring push 52d.

Cable assemblies may use any suitable fiber optic cables for the connector. However, different fiber optic cables 140 may require different structures for attaching and strain-relieving the cable. As discussed, fiber optic cable 140 may comprise one or more optical fibers, one or more tensile elements such as strength members or strength components, and a cable jacket, but other suitable components are possible. The tensile elements of fiber optic cable 140 (not shown) are typically secured to a cable attachment region of connector 200 or connector assembly 52. In this embodiment, the strength members of cable 140 such as aramid yarns, fiberglass yarns or the like are positioned about a rear portion of spring push 52d and secured thereto using crimp band 240. However, cable 140 may be strain-relieved to connector 200 in other suitable manners depending on the cable design and connector components used. For instance, strength members or strength components may be secured to the body 255 such as by using a crimp band or an adhesive.

As shown in FIG. 28, connector 200 comprises a body 255 for securing the connector assembly 52 at a front end of one or more shells. In this embodiment, body 255 comprises a first shell 255a and a second shell 255b that cooperate to form the body 255. Shells 255a and 255b may be the same part or not depending on the desired construction for the connector. In this embodiment, shells 255a,255b each comprise a latch 255L and a catch 255C for securing the first and second shells together in a snap-fit construction for ease of assembly. Simply stated, the latch 255L of one shell cooperates with the catch 255C of the other shell and vice versa for securing the two shells together. Other configurations for shells 255a,255b are also possible such as securing the shells with a crimp band or adhesive as desired or required. Connector 200 may also comprise other optional components such as a cable boot 266, a heat shrink tube 267, a second crimp band, and/or one or more O-rings for sealing. For complexity reduction and simplification, the connector 200 can use many of the same parts as the OptiTap® plug connector 5 or other standard parts as desired; however, certain components may be specific to connector 200.

By way of explanation, other embodiments of body 255 may have the shells secured with a crimp band that is deformed about an outer barrel portion of the body 255. Further, the crimp band may also be used for securing the tensile elements of cable 140 to the outer barrel of the body 255. For instance, the tensile elements may be a plurality of tensile yarns attached between an outer barrel of body 255 and the crimp band. In other embodiments, one or more strength components such as GRP rods maybe secured to the cable attachment region of the fiber optic connector such as between the shells 255a,255b. Alternatively, two crimp bands may be used for cables or constructions where it is desired to strain-relieve the fiber optic cable directly to the connector assembly 52 and to body 255. By way of example, tensile elements such as aramid yarns may be secured to the connector assembly 52 as discussed herein and the second crimp band is used for strain-relieving tensile elements to the body 255. Connectors may also include a dust cap, but other suitable configurations are possible using fewer or more components. For instance, connector 200 may also include an optional lanyard (not numbered) for the dust cap as desired so it is prevented from being lost or separated from the assembly. Generally speaking, most of the components of fiber optic connector 200 are formed from a suitable polymer, but other materials such as metal are possible such as discussed herein.

Figure 29:
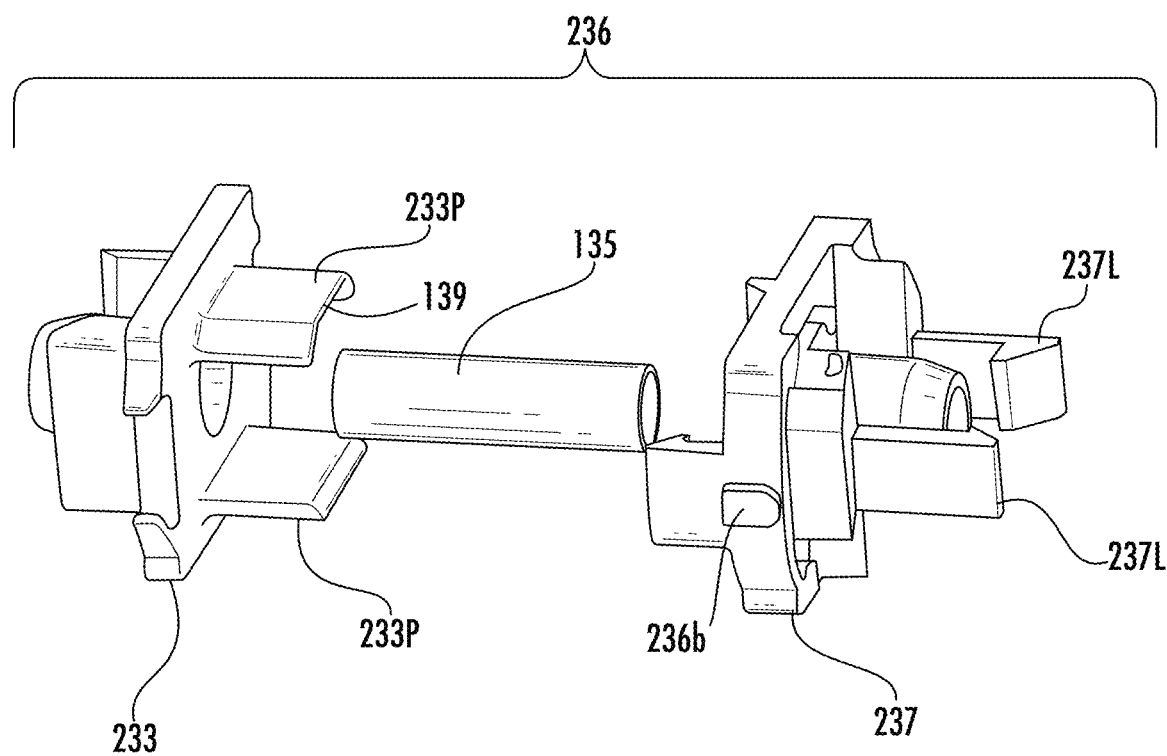
FIGS. 29 and 30 are exploded perspective views of the connector sleeve assembly of the fiber optic connector of cable assembly of FIGS. 24-26.
Figure 30:
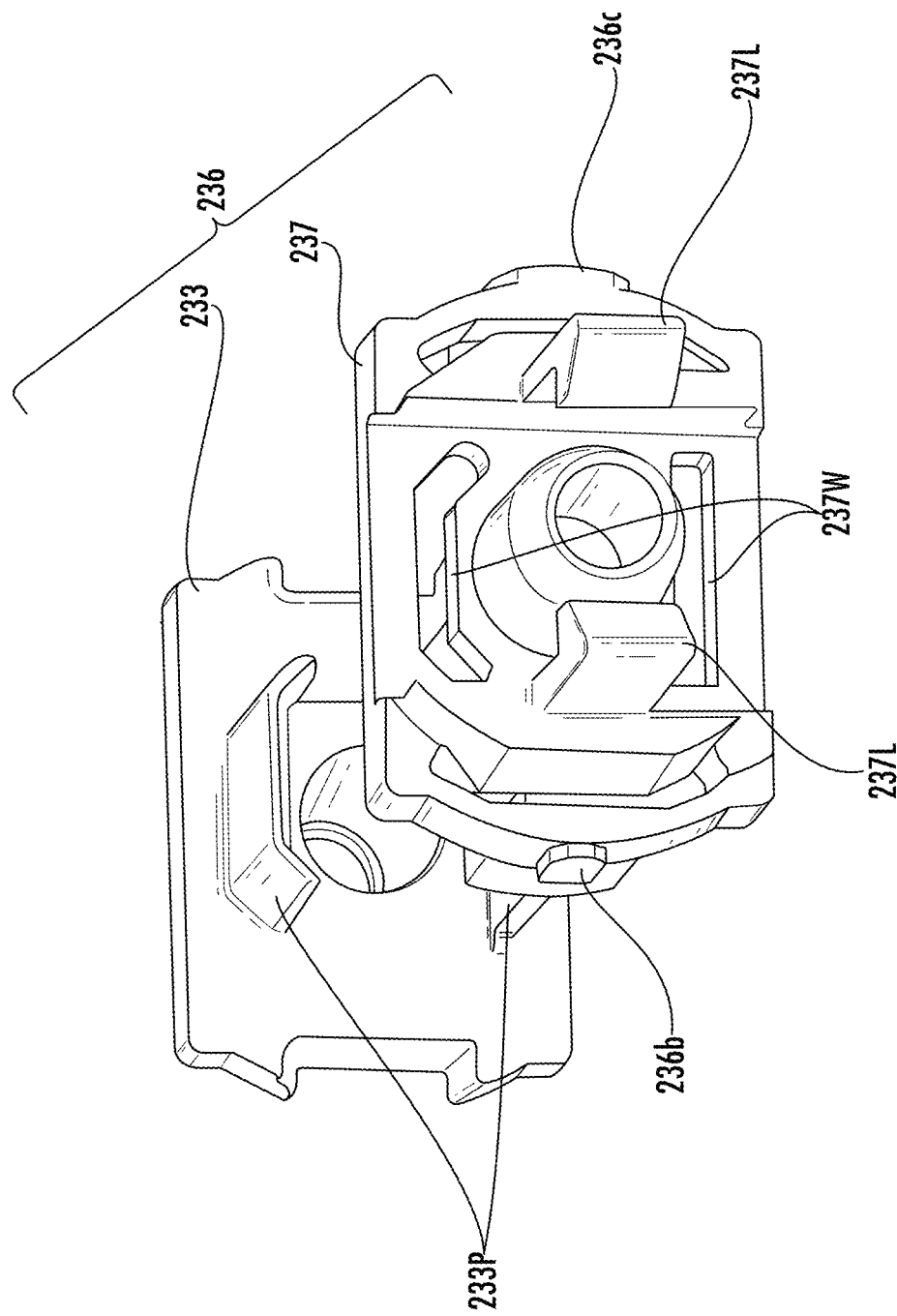
Figure 31:
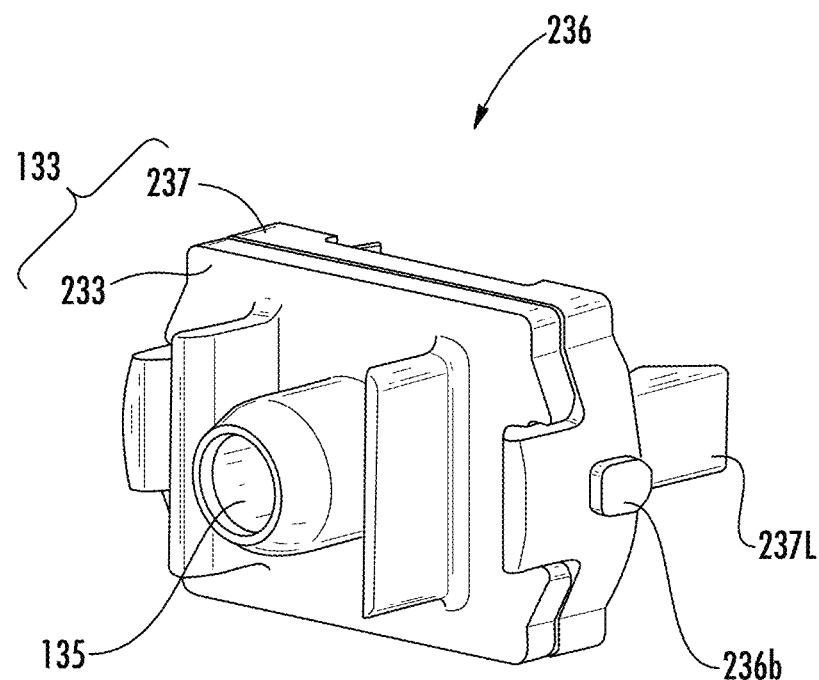
FIGS. 31 and 32 are front and rear perspective views of the assembled connector sleeve assembly of FIG. 24.
Figure 32:
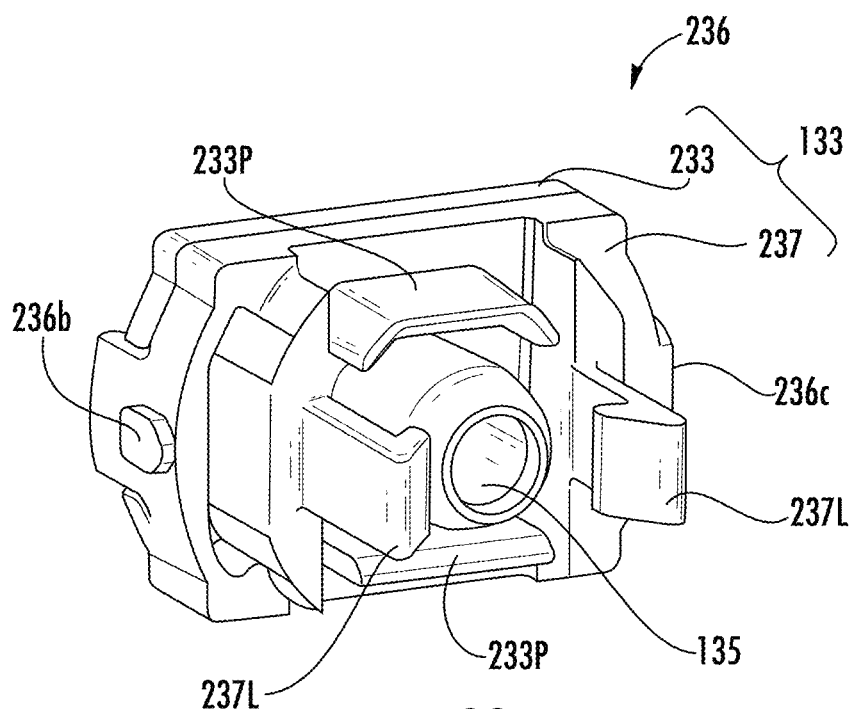

FIGS. 29 and 30 are exploded perspective views of the connector sleeve assembly 236 of the fiber optic connector 200 and FIGS. 31 and 32 are front and rear perspective views of the assembled connector sleeve assembly 236. Connector assembly 236 comprises housing 133 and the ferrule sleeve 135. In this embodiment, housing 133 comprises a first portion 233 and a second portion 237. First portion 233 and second portion 237 cooperate to capture ferrule sleeve 135 therein. Housing 133 of connector 200 comprises a passageway between a first end and a second end and the ferrule sleeve 135 is disposed within the passageway. As discussed herein, ferrule sleeve 135 is "loosely captive" within the passageway of housing 133.

First portion 233 of housing 133 comprises one or more protrusions 233P that extend from its flange (not numbered) toward the second portion 237 of the housing. Second portion 237 of housing 133 comprises one or more windows or slots 237W formed in its flange (not numbered) that cooperate with the one or more protrusions 233P of the first portion 233. Specifically, the one or more protrusions 233P of the first portion 233 align with the one or more windows or slots 237W of the second portion 237 for orienting the first portion 233 with the second portion 237. More specifically, the protrusions 233P and windows 237W have different shapes as shown that orient the connector assembly 52 with the connector sleeve assembly so the connector sleeve assembly may only attach to the connector assembly in one orientation. In other words, one of the protrusions 233P has an angular shape acting as an orientation rail 139 for cooperating and aligning with the asymmetric housing of connector assembly 52, thereby aligning the connector assembly 52 with the connector sleeve assembly 236 in only one orientation. Consequently, when the connector sleeve assembly 236 is attached to the connector assembly 52 the first lug 236b and second lug 236c of housing 133 have a specific arrangement with respect to the connector assembly 52 with the asymmetric housing. As depicted and discussed herein, the first lug and the second lugs have different shapes for orienting the connector sleeve assembly 236 with the female coupling housing 264.

As depicted, second portion 237 of housing 133 comprises attachment features for securing the second portion 237 with the first portion 233 of the housing and may be and suitable structure, fastener, adhesive or the like for securing the two portions together in a suitable fashion. Additionally, second portion 237 comprises one or more features for attaching the housing to the connector assembly 52. In this embodiment, the housing 133 of connector sleeve assembly 236 comprises one or more latch arms 237L that engage the connector ledge 52L. Latch arms 237L are configured for attaching the connector sleeve assembly 236 with the housing of connector assembly 52. Of course, other variations of the connector sleeve assembly are possible using the concepts disclosed herein.

Figure 33:
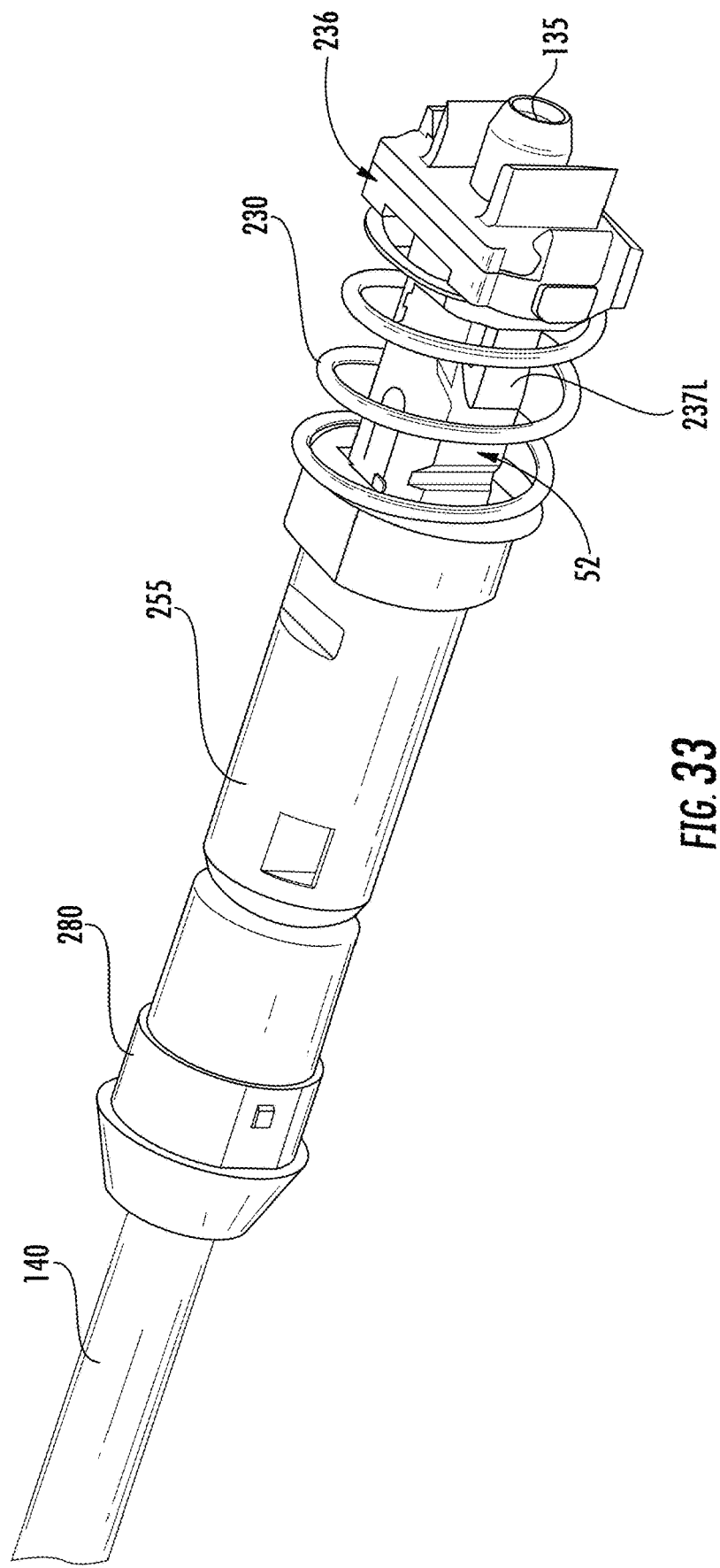
FIG. 33 is a partial assembly perspective view of the cable assembly of FIG. 24 depicting the connector sleeve assembly attached to the connector assembly.

FIG. 33 depicts the connector sleeve assembly 236 attached to the connector assembly 52 during the construction of the connector 200. As shown, the connector sleeve assembly 236 comprises a latch, and the balancing resilient member 230 biases the connector sleeve assembly 236 forward with the latch engaging the connector assembly 52 when assembled. Before attaching, the connector sleeve assembly 236 to the connector assembly 52, the balancing resilient member 230 is disposed radially outward of the connector assembly and then the parts are attached together by snap-fitting or the like. The balancing resilient member 230 contacts a portion of the connector sleeve assembly 236 as shown. Balancing resilient member may have any suitable predetermined resilient force as discussed herein.

In other embodiments, the housing 133 of connector sleeve assembly 136 may be formed as a single component as shown or formed as an assembly of more than one component. However, the concepts disclosed herein may be used with any suitable connector sleeve assembly such as having a housing comprising several components if desired.

Figure 34:
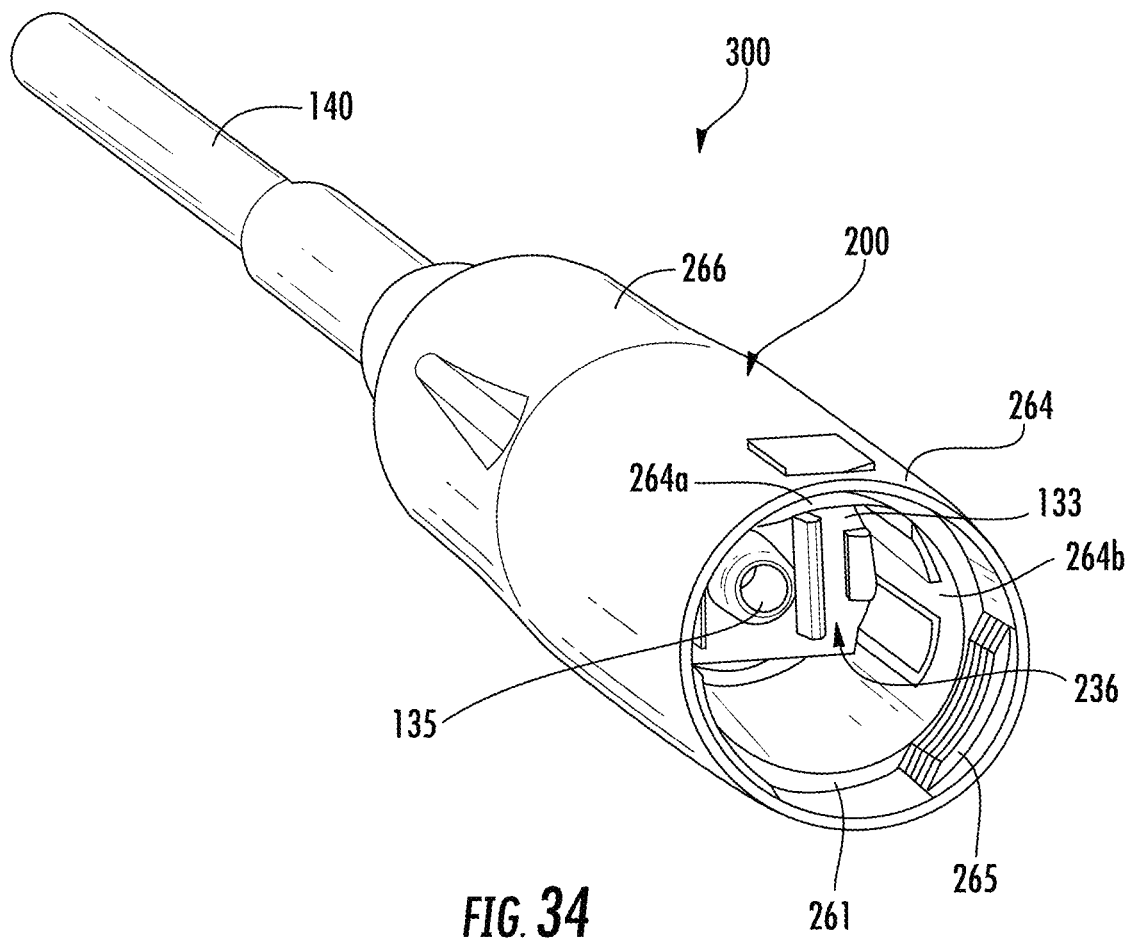
FIG. 34 is an end perspective view of the cable assembly of FIG. 24 with the dust cap removed.

FIG. 34 is an end perspective view of the cable assembly 300 with the dust cap 168 removed from fiber optic connector 200. Female coupling housing 264 of connector 200 may have any suitable construction for the fiber optic connector using the concepts disclosed herein. The female coupling housing 264 is sized for receiving the male plug connector 5 within the front end opening 161 for direct optical mating. Fiber optic connector 200 has a relatively small form factor and aligns the plug connector 5 in the proper orientation so it may only mates in one direction. Further, the optical coupling between the connector 200 and the plug connector 5 is environmentally sealed. Additionally, fiber optic connector 200 may be optically coupled and uncoupled with plug connector 5 as desired.

As best shown in FIG. 25, female coupling housing 264 has an elongate structure with a passageway 263 extending from the opening at a front end 261 to a rear end 162 and sized so that the shroud of the plug connector 5 fits into the front end 261 of passageway 263 when properly aligned. Consequently, plug connector 5 may be directly mated with the fiber optic connector 200 for making an optical connection therebetween. As shown, female coupling housing 264 includes a first portion at the front end that includes the internal attachment feature such as internal threads 265 that cooperate directly with the complimentary external threads of plug connector 5. Once the plug connector 5 is attached to the fiber optic connector 200 the assembly is suitable for making an optical connection therebetween.

Female coupling housing 264 includes features for aligning and securing connector sleeve assembly 236 along with alignment features for correctly orientating plug connector 5. In one embodiment, female coupling housing 264 includes a stop ledge 264a integrally formed in a side wall (i.e., disposed on the side wall) that is disposed rearward of internal threads 265. Stop ledge 264a is configured so that it only allows the shroud of plug connector 5 to fully seat within the female coupling housing 264 in one orientation for keying the optical coupling. In other words, the shroud of the plug connector 5 has alignment fingers having different shapes and the stop ledge 264a only allows the plug connector 5 to fully seat for optical coupling in one orientation by preventing insertion of the larger alignment finger into the female coupling housing 264 past the stop ledge 264a. Female coupling housing 264 also comprises a first retention feature 264b and a second retention feature 264c (not visible). First retention feature 264b and second retention feature 264c have different sizes that cooperate with lugs or tabs 236b, 236c disposed on connector sleeve assembly 236 so that it may only fully seat into the female coupling housing 264 in one orientation. Further, the stop ledge 264a has a specific orientation relative to first retention feature 264b and second retention feature 264c.

When fully assembled the body 255 fits into female coupling housing 164 and may be keyed to direct the insertion of the same into the coupling housing 264 in the correct orientation. In this case, shells 255a, 255b include planar surfaces on opposite sides of body 255 to inhibit relative rotation between body 255 and female coupling housing 264. In other embodiments, the body 255 may be keyed to the female coupling housing 264 using other configurations such as a complementary protrusion/groove or the like.

The rear end of housing 264 includes second portion (not numbered) having a reduced cross-section. The second portion is used for securing heat shrink tubing 267 (the heat shrink tubing is depicted in the shrunk form in FIG. 25) for providing environmental protection between the housing 264 and the fiber optic cable 140 and weatherproofing the cable assembly. The other end of heat shrink tubing 267 is disposed about a portion of the cable, thereby inhibiting water from entering connector 200. Further, the second portion allows for the attachment of boot 266 to the rear end of the female coupling housing 264. After the heat shrink tubing 267 is attached, boot 266 may be slid over heat shrink tubing 267. Specifically, boot 266 may be positioned over the shrink tubing 267 at rear end 262 of female coupling housing 264 for providing further bending strain relief for the cable assembly.

As discussed, boot 266 may be formed from a flexible material such as KRAYTON or the like. Heat shrink tubing 267 and boot 266 generally inhibit kinking and provide bending strain relief to the cable 140 near connector 200. Boot 266 has a longitudinal passageway (not visible) and may have a stepped profile therethrough. Dust cap 268 has external threads for engaging the internal threads of female coupling housing 264 for attachment and thereby inhibit dirt and debris from entering the connector 200 via the front end 261 of female coupling housing 264 when not mated. Moreover, the dust cap 268 may include an O-ring for providing a weatherproof seal between fiber optic connector 200 and dust cap 268 when installed.

FIG. 35 is a perspective view of the cable assembly 200 being aligned with a complimentary plug connector 5 for mating. As shown, the shroud of the male plug connector 5 has alignment fingers having different shapes and when mated the female coupling housing 264 only allows the plug connector 5 to fully seat for optical coupling in one orientation by preventing insertion of the larger alignment finger into the female coupling housing 264 past the stop ledge. In one embodiment, the correct mating orientation is marked on the female coupling housing 264 such as an alignment indicia so that the craftsman can quickly and easily mate connector 200 with the plug connector 5. For instance, the alignment indicia may be an arrow or dot molded into the female coupling housing 264, however, other suitable indicia may be used. Thereafter, the craftsman engages the internal attachment feature 265 such as internal threads of female coupling housing 264 with the complimentary external threads of plug connector 5 for making the optical connection.

Additionally, the optical connection is easily connected or disconnected by merely mating or unmating the plug connector 5 with the fiber optic connector 200 by threadly engaging or disengaging the coupling nut on the plug connector 5 with the attachment features 265.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic connector, comprising:
    a connector assembly comprising a ferrule and a resilient member for biasing the ferrule forward;
    a connector sleeve assembly comprising a housing with a passageway between a first end and a second end and a ferrule sleeve and the housing having one or more features configured for attaching to the connector assembly, wherein the ferrule of the connector assembly is at least partially disposed in the ferrule sleeve when assembled; and
    a balancing resilient member for biasing the housing with its ferrule sleeve of the connector sleeve assembly to a forward position, the balancing resilient member comprising a predetermined resilient force that is greater than the friction force required for displacement of the ferrule within the ferrule sleeve.

2. The fiber optic connector of claim 1, wherein the predetermined resilient force is 2.5 Newton or greater.

3. The fiber optic connector of claim 1, wherein the ferrule has a diameter of about 2.5 millimeters and the predetermined resilient force is 5 Newton or greater.

4. The fiber optic connector of claim 1, wherein the ferrule has a diameter of about 1.25 millimeters and the predetermined resilient force is 2.5 Newton or greater.

5. The fiber optic connector of claim 1, wherein the connector sleeve assembly comprises a latch, and the balancing resilient member biases the connector sleeve assembly forward with the latch engaging the connector assembly when assembled.

6. The fiber optic connector of claim 1, wherein a portion of the balancing resilient member is disposed radially outward of the connector assembly.

7. The fiber optic connector of claim 1, further comprising a stop for the connector sleeve assembly.

8. The fiber optic connector of claim 1, the fiber optic connector comprising a portion of the balancing resilient member contacts a portion of the connector sleeve assembly.

9. The fiber optic connector of claim 1, wherein the housing of the connector sleeve assembly comprises a first portion and a second portion.

10. The fiber optic connector of claim 1, further including a ferrule holder and the resilient member of the connector assembly biases the ferrule holder and the ferrule forward when assembled.

11. The fiber optic connector of claim 1, further comprising a female coupling housing comprising an opening for receiving a complimentary connector.

12. The fiber optic connector of claim 1, the connector assembly further comprising a housing and the connector assembly being an SC connector assembly.

13. The fiber optic connector of claim 1, further comprising a crimp band.

14. The fiber optic connector of claim 1 being a portion of a cable assembly further comprising a fiber optic cable attached to the fiber optic connector.

15. The fiber optic connector of claim 14, wherein the fiber optic cable further comprises strength members secured to a cable attachment region.

16. The fiber optic connector of claim 14, further comprising a tensile element of the fiber optic cable being a plurality of tensile yarns attached between an outer barrel of the body and a crimp band or one or more strength components disposed between a first shell and a second shell of the body.

17. The fiber optic connector of claim 14, further comprising a first shell and a second shell that are secured using a crimp band and/or an adhesive.

18. The fiber optic connector of claim 14, wherein the fiber optic cable has an optical fiber having a buffer layer that enters the body and enters the connector assembly.

19. The fiber optic connector of claim 14, the cable assembly further includes a boot.

20. A method of assembling a fiber optic connector assembly, comprising:
    providing a connector assembly comprising a ferrule and a resilient member for biasing the ferrule forward;

providing a connector sleeve assembly comprising a housing with a passageway between a first end and a second end, a ferrule sleeve and one or more latch arms;

inserting the connector assembly at least partially into the passageway of the connector sleeve assembly and the ferrule at least partially into the ferrule sleeve;

installing a balancing resilient member for biasing the connector sleeve assembly to a forward position with the latch of the connector assembly engaging the connector assembly, wherein the balancing resilient member has a predetermined resilient force that is greater than the friction force required for displacing the ferrule within the ferrule sleeve; and placing the connector sleeve assembly within a female coupling housing comprising an opening for receiving a complimentary connector.

\* \* \* \* \*